United States Patent
Fritsch et al.

(10) Patent No.: US 12,223,214 B2
(45) Date of Patent: *Feb. 11, 2025

(54) METHOD AND SYSTEM FOR ASSET ROUTING

(71) Applicant: Lob.com, Inc., San Francisco, CA (US)

(72) Inventors: Britt Fritsch, San Francisco, CA (US); Karan Kwatra, San Francisco, CA (US); Mercedes Bernard, San Francisco, CA (US); Lucas Jerome Birdeau, San Francisco, CA (US)

(73) Assignee: Lob.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,938

(22) Filed: Sep. 4, 2023

(65) Prior Publication Data
US 2023/0409260 A1    Dec. 21, 2023

Related U.S. Application Data

(63) Continuation of application No. 18/189,626, filed on Mar. 24, 2023, now Pat. No. 11,782,662.

(60) Provisional application No. 63/323,837, filed on Mar. 25, 2022, provisional application No. 63/336,131, filed on Apr. 28, 2022.

(51) Int. Cl.
*G06F 3/12*    (2006.01)
(52) U.S. Cl.
CPC .......... *G06F 3/1262* (2013.01); *G06F 3/1203* (2013.01); *G06F 3/1275* (2013.01)
(58) Field of Classification Search
CPC ..... G06K 7/1413; G06F 3/12; G06Q 10/0833
See application file for complete search history.

(56) References Cited

U.S. PATENT DOCUMENTS

| | | | |
|---|---|---|---|
| 6,674,038 B1 * | 1/2004 | Latta | B07C 3/00 700/226 |
| 7,778,939 B2 | 8/2010 | Ogg et al. | |
| 8,462,371 B1 * | 6/2013 | Uhlig | G06F 40/174 358/1.15 |
| 9,977,633 B1 | 5/2018 | Khafizova | |
| 10,482,356 B2 | 11/2019 | Tastl et al. | |
| 11,113,657 B2 | 9/2021 | Avidar et al. | |
| 11,221,813 B2 | 1/2022 | Avidar et al. | |
| 11,782,662 B1 | 10/2023 | Fritsch et al. | |

(Continued)

FOREIGN PATENT DOCUMENTS

| | | |
|---|---|---|
| JP | 2005050045 A | 2/2005 |
| JP | 2013206235 A | 10/2013 |

OTHER PUBLICATIONS

"Are Print Providers switched automatically based on the customer's delivery details?", Printify, first downloaded Dec. 14, 2022, https://help.printify.com/hc/en-us/articles/4483623864593-Are-Print-Providers-switched-automatically-based-on-the-customer-s-delivery-details-.

(Continued)

*Primary Examiner* — John R Wallace
(74) *Attorney, Agent, or Firm* — Jeffrey Schox; Diana Lin

(57) ABSTRACT

The method for asset routing can include: determining a digital asset, routing the digital asset to a print partner based on the mail parameters, optionally printing a physical version of each digital asset, and optionally drop-shipping the physical assets. However, the method can additionally or alternatively include any other suitable elements.

4 Claims, 12 Drawing Sheets

(56) References Cited

U.S. PATENT DOCUMENTS

| | | |
|---|---|---|
| 2002/0019786 A1 | 2/2002 | Gonzalez et al. |
| 2003/0218770 A1* | 11/2003 | Field .................... G06Q 50/188 358/1.15 |
| 2004/0207867 A1 | 10/2004 | Stringham |
| 2007/0076237 A1 | 4/2007 | Kudo |
| 2009/0055206 A1 | 2/2009 | Orbke |
| 2009/0187733 A1 | 7/2009 | El-Ghazawi |
| 2011/0029429 A1 | 2/2011 | Whitehouse |
| 2012/0084222 A1 | 4/2012 | Zimberoff et al. |
| 2013/0054491 A1 | 2/2013 | Chatow et al. |
| 2013/0129372 A1 | 5/2013 | Manabe |
| 2014/0079428 A1 | 3/2014 | Park et al. |
| 2014/0149308 A1 | 5/2014 | Ming |
| 2014/0214716 A1 | 7/2014 | Mauch |
| 2014/0258832 A1 | 9/2014 | Hepp et al. |
| 2016/0300250 A1 | 10/2016 | Rai et al. |
| 2016/0352976 A1 | 12/2016 | Kuroiwa |
| 2017/0060490 A1 | 3/2017 | Rajalingam et al. |
| 2018/0240066 A1 | 8/2018 | Streebin et al. |
| 2019/0311325 A1 | 10/2019 | Reblin et al. |
| 2020/0234229 A1 | 7/2020 | Bolha et al. |
| 2020/0278987 A1 | 9/2020 | Liu et al. |
| 2020/0310725 A1 | 10/2020 | Fukami |

OTHER PUBLICATIONS

"How Do We Route Print Jobs?", Smart Order Routing, https://www.cloudprinter.com/order-routing, Nov. 9, 2020, 9 pages.

"Order Routing Feature", Printify, first downloaded Dec. 14, 2022, https://help.printify.com/hc/en-us/articles/4483625090321-Order-Routing-Feature.

"Send Tracker FAQ", https://sendoso.zendesk.com/hc/en-us/articles/360045052631-Send-Tracker-FAQ-Senoso, first downloaded Nov. 18, 2020.

Chen, Anthony, "How We Solve Problems at Lob—Intelligent Mail Through Routing", Lob Blog, https://www.lob.com/blog/how-we-solve-problems-at-lob-intelligent-mail-through-routing, Jul. 18, 2018, 15 pages.

Comber, Sam, "Machine learning innovations in address matching: A practical comparison of word2vec and CRFs", wileyonlinelibrary.com/journal/tgis, Transactions in GIS, 2019.

Duchene, Patty, "Reporting Metrics", https://help.postal.io/en/articles/3727502-reporting-metrics, first downloaded Nov. 18, 2020.

* cited by examiner

| | | | |
|---|---|---|---|
| ● | Print partner | | |
| ■ | Local carrier facility | ------ | Local carrier facility coverage zone |
| ⬭ | Regional carrier facility | ——— | Regional carrier facility coverage zone |
| ◻ | Super-regional carrier facility | — — | Super-regional carrier facility coverage zone |

METHOD AND SYSTEM FOR ASSET ROUTING

CROSS-REFERENCE TO RELATED APPLICATIONS

This application is a continuation of U.S. application Ser. No. 18/189,626 filed 24 Mar. 2023, which claims the benefit of U.S. Provisional Application No. 63/323,837 filed 25 Mar. 2022 and U.S. Provisional Application No. 63/336,131 filed 28 Apr. 2022, each of which is incorporated in its entirety by this reference.

TECHNICAL FIELD

This invention relates generally to the mailing services field, and more specifically to a new and useful method for asset routing.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
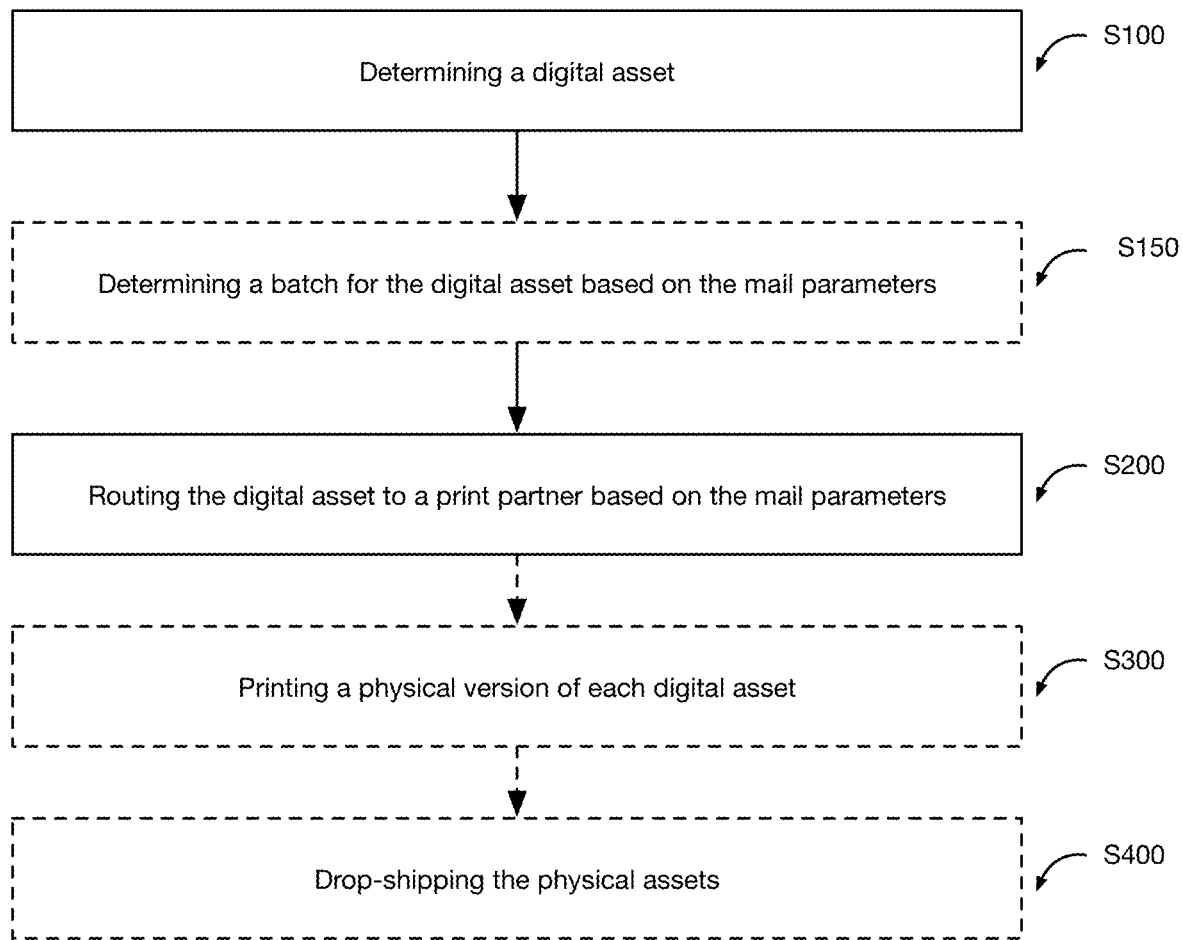
FIG. 1 is a flowchart representation of a variant of the method.

As shown in FIG. 1, the method for asset routing can include: determining a digital asset S100, routing the digital asset to a print partner based on the mail parameters S200, optionally printing a physical version of each digital asset S300, and optionally drop-shipping the physical assets S400. However, the method can additionally or alternatively include any other suitable elements. The method functions to route individual digital assets to different print partners based on the delivery location of each digital asset while minimizing or optimizing for time-to-delivery.

2. Examples

In an example, the method can include: batching digital assets from disparate orders into batches, each associated with a different carrier facility (e.g., processing and distribution center (P&DC), Bulk Mail Center (BMC), etc.), based on the digital asset's permutation and recipient destination inclusion within the geographic coverage of the respective carrier facility; selecting a print partner for the respective carrier facility and sending the batch to the print partner for physical asset printing (and optionally, carrier facility drop-off) when a batch satisfies a print condition at a cut-off time; and, when the regional batch does not satisfy the print condition by the cut-off time, iteratively re-batching the digital assets into new batches based on the geographic coverage of higher- and/or lower-level carrier facilities until a print condition is met; selecting a print partner for the carrier facility associated with a satisfactory batch; sending the batch of digital assets to the selected print partner for physical asset printing (and optionally, carrier facility drop-off); and optionally geo-routing the digital asset if no satisfactory batch is found.

In an illustrative example, the method includes: determining a digital asset (e.g., digital mail piece); assigning the digital asset to a regional batch based on the digital asset's permutation and recipient destination; sending the regional batch to a (regional) print partner for physical asset printing when the regional batch satisfies the print condition (e.g., includes at least a threshold amount of mail) by a cut-off time (e.g., 5,000 digital assets, 100 lbs. of mail, etc.); rolling the regional batch up to a national batch when the regional batch does not satisfy the condition (e.g., include the threshold amount of mail) at the cut-off time, and sending the national batch to a (national) print partner when the national batch satisfies a second condition (e.g., includes a threshold amount of mail, the same or different condition from that required for the regional batch, etc.), and geo-routing each digital asset of the national batch when the national batch does not include the threshold amount of mail. Geo-routing a digital asset can include: routing the digital asset to a local print partner associated with a carrier facility servicing the digital asset's destination (e.g., the digital asset is within the carrier facility's delivery zone or geographic region), wherein the digital asset is preferentially routed to a local carrier facility, regional carrier facility, then national carrier facility, in that order. The digital assets within the batches can be from the same or different order (e.g., received from the same or different entity). Digital assets from the same order can be individually routed or routed together. The digital assets can each be associated with a target delivery date (TDD), wherein a physical analog of the digital asset can be routed, printed, drop-shipped, or otherwise managed on a date calculated from the TDD.

3. Technical Advantages

Variants of the technology for asset routing can confer several benefits over conventional systems.

First, enterprise marketers care about a digital asset reaching the recipient's mailbox within a certain date range (e.g., a target delivery date +/−2 days). Conventionally, printers will print an entire order (e.g., all digital assets within a marketing campaign), and insert the digital assets of the order into the mail stream at a single location (e.g., a local facility). However, because the mail partner system (e.g., carrier, such as USPS) is hierarchical, in the worst-case scenario, each digital asset can travel a long distance from the first local facility, to a first regional facility, to a first national facility, to a second national facility, to a second regional facility, and then to a second local facility before finally being delivered to each digital asset's destination. In addition to adding transit time, the conventional method wastes energy (e.g., fuel) and manpower in transporting the physical assets over long geographic distances. While print partners are capable of drop shipping batches of mail at regional and/or national facilities to minimize the distance and/or delivery time, this is not practically possible because the digital assets in each order have geographically dispersed recipient destinations—a portion of the order's digital assets will need to go through the vast majority of the local-regional-national-regional-local chain. Even if portions of the order shared the same regional or national recipient region, those portions cannot satisfy the minimum amount of mail required for drop shipping. Variants of the technology can overcome this challenge and more reliably deliver a digital asset on time by splitting orders and aggregating the resultant individual digital assets by recipient location until a threshold condition (e.g., minimum order volume) is satisfied to maximize the probability of drop-shipping (e.g., postal drop shipping). Variants of the technology can further decrease fuel waste (e.g., improve physical asset distribution efficiency) and/or decrease carbon expenditure facilitating physical asset generation proximal the distributing carrier facility and/or proximal the delivery location (e.g., by sending the digital asset to the print partner associated with the carrier facility and/or near the delivery location for printing). Variants of the technology can also accommodate the print partners' inability to print a diverse set of asset permutations in a single run by forming the digital asset batches by asset permutation (e.g., postcard, letter, letter size, whether an envelope is needed, etc.). In variants, the technology can guarantee delivery by a target date, even when using low-priority mailing channels (e.g., package services, marketing mail, periodicals, priority mail, etc.).

Second, variants of the technology can enable small-scale mail campaigns, including those with as few as a single digital asset in an order, to leverage the benefits of drop-shipping by aggregating digital assets from multiple orders in order to satisfy the minimum amount of mail required for drop shipping.

Third, variants of the technology can enable more flexible asset routing by continuing to aggregate digital assets into batches to aim for drop-shipping up until a cutoff time soon before the production date, at which point the technology can determine an optimal fallback option from among multiple alternative routing schemes.

However, the technology can confer any other suitable benefits.

4. System

Figure 2:
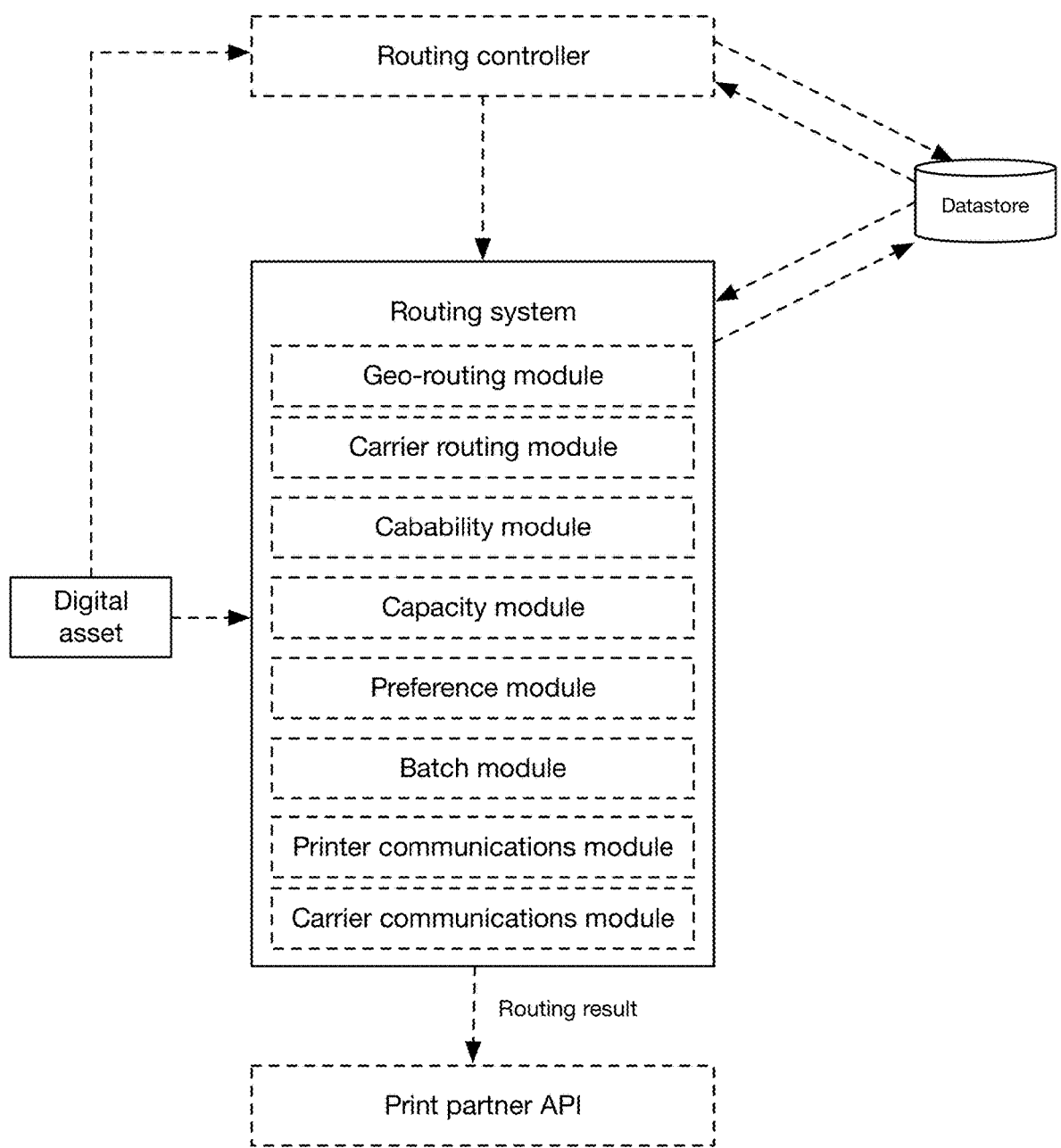
FIG. 2 is a schematic representation of a variant of the system.

The method is preferably performed using a system including: a computing system, one or more routing systems, one or more routing controllers, one or more datastores, and/or any other suitable components (e.g., example shown in FIG. 2). However, the method can additionally or alternatively be performed using any other suitable system. The system preferably functions to route individual digital assets to different print partners based on the delivery location of each digital asset while ensuring that each digital asset is delivered within a specific target time range. However, the system can provide any other suitable function. The system is preferably fully automated, but can additionally or alternatively request manual confirmation before executing any steps, accept manual inputs to override any automated processes or decision-making, be dependent on triggers from an external system, and/or otherwise be controlled.

The system preferably processes one or more orders from one or more senders. Each order preferably includes: one or more digital assets, an associated order volume (e.g., number of digital assets), and one or more timestamps (e.g., time at which the order was received, maximum time allocation for time of order receipt to print, etc.), but can additionally or alternatively include any other suitable information.

Each order can include one or more digital assets. Orders can be received as small asset orders (e.g., 1 or 2 pieces), mid-sized asset orders (e.g., 10, 30, 50, 60, 80 assets), bulk asset orders (e.g., with at least 100, 200, 500, or more assets), but can alternatively be or be otherwise sized.

The digital asset can be unique (e.g., each digital asset can have different asset parameters, images, and/or otherwise differ from other assets within the order), but can alternatively be generic or non-unique (e.g., have the same asset parameters, have the same graphics, etc.), or be otherwise related. The assets within an order are preferably addressed to different recipients, but can alternatively be addressed to the same recipient.

The digital asset of an order is preferably a press ready proof (e.g., ready for print), but can additionally or alternatively be proof parameters, the raw constituent components of a proof, or have any other suitable format. The proof can be represented: as a PDF, in HTML, as an image (e.g., PNG, JPG, etc.), and/or any other suitable digital format.

Each digital asset can be associated with an asset identifier. The asset identifier can be: globally unique, unique within a batch, temporally unique, nonunique, or otherwise determined. The asset identifier can be associated with: a mail sender, a mail recipient, an order identifier, and/or any other suitable information.

In a first variation, the order is represented as a JSON object that adheres to an API, but can additionally or alternatively be an XML, YAML, plain text, and/or any other suitable data structure. The order can be received as a programmatic function associated with an array. The array can specify different parameter values for each recipient, wherein the system can automatically generate each asset for a given recipient based on the programmatic function and respective values from the array.

The digital asset is preferably associated with a set of mail parameters, which can include: asset parameters (e.g., defining the permutation), delivery information, and/or other information.

The mail parameters can include asset parameters (e.g., metadata, specifications, etc.), which can include: type (e.g., letter, postcard, pamphlet, etc.), color (e.g., black and white, color, etc.), perforation, priority (e.g., first class, standard, fragile, etc.), size (e.g., dimensions such as length width, number of sheets, etc.), paper poundage, coating, form factor, imagery, quality (e.g., image resolution, pixel resolution, pixel density, dpi, etc.), delivery information, and/or any other suitable parameter. Mail parameters can be associated with the digital version of the digital asset and/or an intended physical version (e.g., a physical analog) of the digital asset after printing.

The mail parameters can include delivery information, which can include: a delivery location (e.g., recipient location; an address, geolocation, a zip code, a 3-digit zip code, a 5-digit zip code, etc.), a delivery timeframe (e.g., target delivery date and/or date range, mail by date, etc.), a recipient, and/or any other suitable information.

The mail parameters can include a permutation, which can function to define a combination of the asset parameter values associated with a digital asset. The permutation is preferably defined by a subset of the asset parameter values associated with a digital asset (e.g., all but the address and recipient), but can alternatively be defined by all the asset parameter values associated with a digital asset. The permutation can be associated with a fixed combination of values (e.g., wherein each value must meet a specific requirement). The permutation can alternatively be associated with a flexible combination of asset parameter values (e.g., wherein one or more values can vary according to a preference range, a set of fallback options, and/or other parameters). In an example, a value must meet a baseline condition buy may exceed the condition (e.g., wherein the image resolution must be at least a customer-specified resolution).

However, an order can additionally or alternatively be otherwise defined.

The system can assign a digital asset to a batch. A batch is preferably a group of assets, different from an order, that can be transferred from a print partner to a delivery service. A batch can include digital assets from a plurality of orders, digital assets from a single order, and/or include any other suitable digital assets. Each batch is preferably associated with a single carrier facility (e.g., P&DC), but can alternatively be associated with multiple carrier facilities (e.g., a low-level P&DC and higher-level P&DCs that encompass the low-level P&DC), with a geographic region, with a print partner, and/or with any other suitable entity. Each batch is preferably sent to a single print partner for printing, but can alternatively be sent to multiple print partners for printing, or not associated with a print partner. Each print partner can host one or more batches (e.g., concurrently or serially).

A batch can be associated with a threshold condition (e.g., minimum order volume/quantity, etc.), which can determine whether the batch should be sent to the print partner for printing, and/or whether the drop-ship requirements have been met. The threshold condition can be predetermined, determined by a delivery service (e.g., minimum volume to drop-ship, minimum quantity to drop-ship, etc.), determined by the print partner (e.g., minimum volume to print a batch), determined using an optimization (e.g., an optimization over cost, expended fuel, etc.), and/or otherwise determined). The minimum volume and/or quantity can be of: individual assets, individual digital asset proofs (e.g., a unique asset design), and/or any other suitable asset unit.

A batch can be associated with a timeframe (e.g., single business day, span multiple days, etc.). The timeframe can be: a printing timeframe (e.g., the physical assets must be printed within a predetermined timeframe), a mailing timeframe (e.g., the physical assets within the batch must be handed off to the delivery service within a predetermined timeframe), a delivery timeframe (e.g., the physical assets must be delivered to a recipient within a predetermined timeframe), and/or any other suitable timeframe.

A batch can be associated with one or more requirements. Batch requirements can include a permutation, which can define an acceptable combination of asset parameter values for a given batch (e.g., acceptable asset parameter values that can be printed together on the print partner machinery). The permutation preferably specifies values for a subset of the asset parameters, such that a batch can accept digital assets with different asset parameter values, but can additionally or alternatively specify values for the full set of asset parameters. In an example, the permutation specifies the size and image quality of the digital assets to be printed, but leaves the weight asset parameter flexible. Batch requirements can be stored in the datastore, and/or otherwise stored. Batch requirements can be specified by each print partner's machinery capabilities, machine setup, manually (e.g., specified by a print partner, by a system administrator, etc.), automatically determined (e.g., specified by a printing machine; determined based on: the type of machines associated with the print partner, the machines' possible configurations, the batch parameters associated with each configuration, the print partner machine setup required to print the digital assets in an existing batch, etc.), and/or otherwise determined. Batch requirements can be received through a graphical user interface (GUI), a print partner machine interface, or any other suitable interface. The GUI is preferably configured to collect batch requirements for the routing system (e.g., information regarding print partners, regarding modules of the routing system, etc.). The batch requirements can be received: over a wired or wireless connection (e.g., the Internet), a CAN or field bus, and/or any other suitable connection.

However, a batch can be otherwise defined.

The system and method can be used with one or more third-party services. Third party services can include: mail partners, print partners, and/or any other suitable party.

The third-party services can include a set of carriers (e.g., mail partners, delivery services, etc.) that function to receive physical assets (e.g., from one or more print partners, from the platform, etc.) and deliver the physical assets to recipient locations using one or more carrier architectures. Examples of mail partners can be: USPS, Royal Mail, FedEx, UPS, and/or any other suitable carrier. The system preferably interfaces with a plurality of mail partners, but can additionally or alternatively interface with a single mail partner. The mail partner is preferably associated with a set of mail partner parameters, such as minimum batch volume, maximum batch volume, mail batch parameters, pickup times, cost, speed, associated print partners, and/or any other suitable parameter. The mail partner parameters can be: globally applicable, applicable to a route, a geographic region, a timeframe, and/or otherwise limited.

Figure 11:
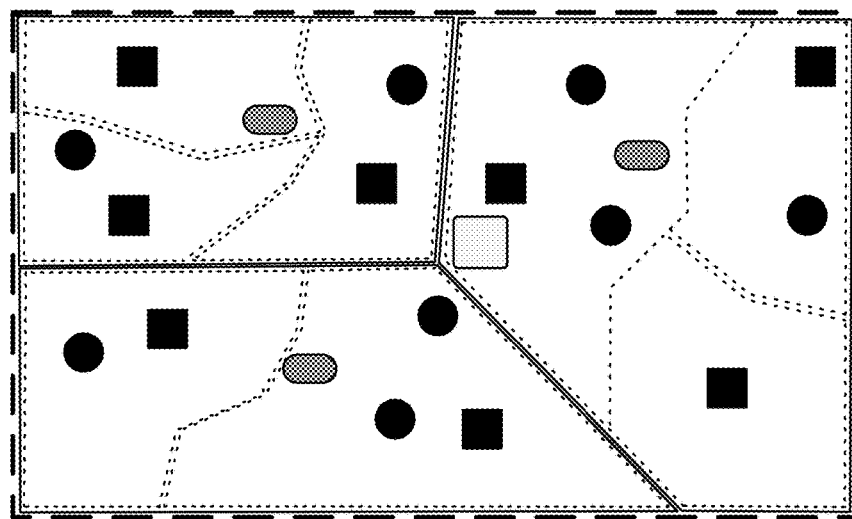
FIG. 11 is an illustrative example of a mail partner and print partner architecture that can be used with the system.

The mail partner's carrier architecture can include: one or more carrier facilities (e.g., processing and distribution centers (P&DCs), Bulk Mail Center (BMC)) that process and/or distribute physical assets (e.g., physical mail assets). For example, a mail carrier can include a plurality of carrier facilities, including: one or more local facilities, one or more regional facilities, one or more super-regional facilities, one or more national facilities, and/or any other suitable facilities (e.g., example shown in FIG. 11). Each facility is preferably capable of receiving drop-shipped batches of assets (e.g., wherein an entity, such as a print partner, can drop off a batch of physical assets at the carrier facility for processing and further mailing), but can alternatively lack the capability. Each facility is preferably associated with a different geographic region (e.g., coverage region, delivery region, delivery zone, etc.) specific to the facility. The facilities are preferably hierarchical, such that each higher-level facility is associated with (e.g., shares a geographic region with, receives and/or delivers to, encompasses the geographic region of, etc.) one or more associated lower-level facilities. The lower-level facilities can be associated with higher-level facilities when the lower-level facilities are located within the higher-level facility's geographic region, when the geographic regions of the lower- and higher-level facilities overlap, when the lower-level facility sends physical assets to or receives physical assets from the higher-level facility, be associated by the mail partner, or be otherwise associated with a higher-level facility. Lowest-level facilities (e.g., local facilities) can pick up and/or deliver physical assets from and/or to recipient locations within their geographic regions. In operation, lower-level facilities that receive physical assets (e.g., mail) outside of their geographic region sends the physical asset to successively higher higher-level facilities until the higher-level facility's geographic region encompasses the delivery location, at which point the higher level facility sends the physical asset down to successively lower-level facilities until the physical asset is sent to a lowest-level facility (e.g., local facility) encompassing the delivery location. The physical asset is then sent from the lowest-level facility to the delivery location. However, the facilities can otherwise interact with each other.

In an example, a local facility is a destination delivery unit (DDU) such as a local post office that is associated with a limited geographic region (e.g., associated with a single zip code, associated with several zip codes, etc.). In a second example, a regional facility is a sectional center facility (SCF) that is associated with a geographic region larger than a local facility, wherein the geographic region encompasses one or more geographic regions of local facilities. In a third example, a super-regional facility (e.g., national facility) is a network distribution center (NDC) that is associated with a geographic region larger than a regional facility, wherein the geographic region encompasses one or more geographic regions of regional facilities.

The third-party services can include a set of print partners that function to generate or create physical versions of a digital asset (e.g., print the digital asset). The print partners can: print physical versions of the digital assets, determine a mail stream insertion date for a digital asset based on the respective target delivery date, hold digital assets until the carrier insertion date, insert the digital asset into the mail stream (e.g., individually or as a batch; drop shipped to a carrier facility or otherwise shipped; etc.), and/or perform other functionalities. The system preferably interfaces with a plurality of print partners, but can additionally or alternatively interface with a single print partner.

Each print partner can be associated with a set of print capabilities, but can alternatively not be associated with print capabilities. A print capability can specify whether the print partner is capable of printing an asset with a certain variable value (e.g., attribute value, etc.). Mail variables can include: mail type (e.g., postcards, self-mailers, letters, checks, etc.), perforation, color, size, shape, and/or any other physical and/or visual mail attribute. A combination of mail variable values (e.g., color self-mailer with a 3"×3" envelope) can be referred to as a mail permutation, wherein different print partners can be capable of printing different mail permutations, based on their printing capabilities. For example, a print partner associated with certain capabilities can print certain mail variable permutations but cannot print other mail variable permutations. Each print partner can have one or more machines, wherein each machine can have one or more configurations, wherein each configuration can have different capabilities, but can be otherwise configured. Different print partners can have different machines with different configurability, and therefore be associated with different capabilities. The set of capabilities can be determined based on the print partner's machinery, be manually specified by the print partner, be determined based on the asset parameters of prior assets printed by the print partner, or be otherwise determined.

Each print partner can be associated with a capacity. The capacity is preferably an overall digital asset volume for a given timeframe, but can alternatively be a digital asset rate or be any other capacity. The capacity is preferably a maximum limit, but can alternatively be a minimum or any other limit. The capacity can be associated with: the print capability (e.g., the mail permutation), the printer themselves, and/or otherwise determined. Capacities can vary per print printer: annually, quarterly, monthly, daily, hourly, by the minute, and/or any other suitable time interval.

Each print partner can be associated with one or more geographic locations (e.g., the geographic location of the print partner's print facility).

Each print partner can be associated with one or more carrier facilities. Each print partner can be associated with one or more local facilities, one or more regional facilities, one or more super-regional facilities, and or any other suitable number of facilities. Each print partner can be associated with a facility (e.g., local facility, regional facility, super-regional facility, etc.) when the print partner location is located within the respective region (e.g., associated with the facility), be associated with the carrier facility that it is geographically closest to, be associated based on travel distance or travel time to the carrier facility, be otherwise associated with a carrier facility, and/or not be associated with a facility. Each print partner can drop batches of physical assets off at the one or more associated carrier facilities, facilitate physical asset batch drop-off at the carrier facility (e.g., using an intermediary carrier or transport entity), facilitate physical asset pickup by the carrier, and/or otherwise transfer the physical asset to the carrier facility.

However, the third-party services can additionally or alternatively include any other suitable elements.

The system preferably includes a computing system, which functions to perform one or more elements of the method. The computing system can be a remote computing system (e.g., server system), a distributed computing system, and/or other computing system. The computing system can execute the routing system and/or portions thereof.

The system preferably includes one or more routing systems. The routing system preferably functions to determine a carrier facility and/or a print partner for a set of digital assets, but can additionally or alternatively determine a prioritized list (e.g., with weighted priority) of print partners or carrier facilities, determine a print partner or carrier facility for an order, and/or provide any other suitable functionality. The routing system is preferably accessible via one or more APIs, but can be otherwise accessible.

The routing system preferably includes one or more modules. The modules can include any number of the following modules, arranged in any other suitable order. The modules can include a: capability module, batch module, preference module, capacity module, carrier routing module, geo-routing module, printer communications module, carrier communications module, and/or any other suitable module.

The capability module, the batch module, the preference module, and the capacity module can be the modules described in U.S. patent application Ser. No. 17/540,521, filed 2 Dec. 2021, which is incorporated herein in its entirety by this reference.

The modules can include a carrier routing module, which can function to determine a target carrier facility for the batch, determine a print partner for the batch, and/or otherwise function.

The carrier routing module can determine a target carrier facility based on: a delivery destination region for the batch, proximity of a print partner, a preference associated with a nearby print partner, a cost associated with a nearby print partner, a cost associated with delivery from the target carrier facility to the delivery addresses of the batch, and/or any other factors. The carrier routing module can use rule sets, heuristics, optimization, models, and/or any other method to route the batch. In examples, the carrier routing module can perform any of the method steps described in S150 or S200, and/or perform any other suitable step.

However, the carrier routing module can be otherwise configured.

The modules can include a geo-routing module, which can function to routing a digital asset to a capable print partner within a region based on the delivery destination.

The geo-routing module can route a digital asset: to a capable print partner that is closest to the delivery location, to the print partner with the highest-preference within a delivery region of the digital asset (e.g., within the same zip code as the digital asset, within 20 miles of the digital asset, etc.), to the lowest-level facility servicing the digital asset's delivery location, to the lowest-level carrier facility servicing the digital asset's delivery location with a capable print partner within a specified range of the carrier facility (e.g., within the service zone of the carrier facility), and/or otherwise route the digital asset. The geo-routing module can use rule sets, heuristics, optimization, models, and/or any other method to route the digital asset. In examples, the geo-routing module can perform S200, and/or perform any other suitable step.

However, the geo-routing module can be otherwise configured.

The modules can include a printer communications module which can function to enable the system to communicate with print partners. The printer communications module can access information (e.g., from a website, via a survey, manually by phone call, etc.) about a print partner's capabilities, capacity, coverage zone, location, upcoming delays, and/or other information that can be used as inputs for the method. Print partner information can be retrieved by querying the datastore, querying a print partner API, and/or be otherwise retrieved. The printer communications module can send information to the print partner regarding orders, order updates, and/or other suitable information.

However, the printer communications module can be otherwise configured.

The modules can include a carrier communications module, which can function to enable the system to communicate with mail carriers. The carrier communications module can access information (e.g., from a website) relevant to mail carrier requirements (e.g., minimum drop-ship volume, etc.), service interruptions, coverage regions, and/or other information that can be used as inputs for the method.

However, the carrier communications module can be otherwise configured.

The system preferably includes a routing controller that functions to coordinate routing system activities and/or interface the routing system components. The routing controller preferably interfaces with a print partner (e.g., via a print partner API) and the routing system, but can additionally or alternatively interface with a graphical user interface (e.g., presented to the sender), and/or interface with any other suitable party. The routing controller preferably accesses/queries the datastore. The routing controller can update the ruleset in the datastore. The routing controller can transmit rulesets to one or more modules of the routing system (e.g., periodically, such as for every digital asset, every 10 assets, every digital asset, every 5 minutes, every hour, etc.; after a rule and/or ruleset update; and/or at any other suitable time). The routing controller can additionally or alternatively communicate volume parameters and/or thresholds to one or more modules of the routing system. The routing controller can receive failed digital assets from the fail queue, orphaned digital assets from the orphan queue, and/or receive any other suitable digital assets. The routing controller can transmit received digital assets to the mail queue, directly to the routing system, to a different system capable of determining a batch associated with a print partner for the specified digital asset, and/or otherwise transmit the digital asset.

However, the routing controller can be otherwise configured.

The system preferably includes one or more datastores. The datastore can preferably be queried, but can be otherwise configured. The datastores can include one or more: module datastores, capacity datastores, queues, print partner databases, carrier databases, and/or any other suitable datastore. The data stored in the datastores can be determined automatically (e.g., via print partner APIs, manufacturing machine APIs, the routing controller API, the GUI, etc.), manually (e.g., by a service administrator), and/or otherwise determined.

The print partner database can store information per print partner (e.g., machine capabilities, counters, etc.) and/or any other suitable information. The information per print partner can include: currently available capacity per print partner, such as one or more counters (e.g., for one or more time periods, batch counters per print period such as the number of digital assets in a batch in a given production period; monthly volume counters such as the number of digital assets and/or orders sent to the print partner in a given month, etc.); capability per print partner (e.g., print permutations that each print partner can print, based on all print partner machinery, the batch parameters, etc.); facilities (e.g., mail carrier facilities) the print partner can delivery to; processing times (e.g., time to upload a quantity of digital assets to the print partner processing system, time to print an order of a specified volume, time to postal drop ship, time to deliver to a mail carrier facility, etc.); prices (e.g.,); requirements (e.g., minimum order volume, acceptable asset parameters, required advance notice time for an order, etc.); one or more weight parameters (e.g., weight priority based on a volume target, volume threshold, batch volume target, and/or batch volume threshold, etc.); and/or any other suitable information. The information per print partner can additionally be stored: per batch, per time period, per order type (e.g., standard order versus drop shipping order); and/or otherwise specified. The weight parameter can be determined automatically (e.g., by the routing controller API) and/or manually (e.g., by a service provider). The weight parameter can be based on capacity, existing/open batch size(s), monthly quota associated with the routing system, daily quota associated with the routing system, and/or otherwise based. Information stored in the print partner database can be: received from the print partner, collected about the print partner (e.g., historical data), predicted, and/or otherwise determined.

However, the print partner database can be otherwise configured.

The carrier database can store information per mail carrier, per mail carrier facility, and/or any other suitable information. Information stored in the carrier database can be: published (e.g., on a website, press brief, brochure, etc.) by, received (e.g., in an email, as a direct quote, on a call, etc.) from, tracked in association with, or otherwise determined about one or more mail carriers and/or mail carrier facilities. Information stored in the carrier database can include: prices, services, quotas, requirements, restrictions, shipping time estimates, actual historical shipping times, other historical data, regions serviced per carrier facility, regions serviced per carrier, holiday schedules, closures, and/or any other information.

However, the carrier database can be otherwise configured.

The datastores preferably include one or more queues, but can additionally or alternatively include sorted lists, hashed set, and/or any other suitable collection of digital assets. Digital assets stored in the queue(s) can be retrieved or enqueued by the routing controller API, by the routing system, and/or by any other suitable entity. The queues can include one or more: mail queues, orphan queues, fail queues, or any other suitable queue.

The datastore preferably includes one or more mail queues. The mail queue can store all digital assets and/or orders received in S100 (e.g., wherein the queue holds each digital asset prior to assigning the digital asset to a batch). Another optional mail queue (e.g., the orphan queue) can store digital assets and/or orders with no associated batch (e.g., no associated print partner) and/or any other suitable digital asset. Another optional mail queue (e.g., the fail queue) can store digital assets that the routing system could not process (e.g., batch requirements were not satisfied, module requirements were not satisfied, etc.). Another optional mail queue (e.g., the geo-routing queue) can store digital assets assigned to be geo-routed. Another optional mail queue (e.g., the carrier facility queue) can store digital assets (e.g., a batch) assigned to a carrier facility and/or print partner. Optionally, digital assets can be sent one at a time from a queue to the print partner.

However, the datastore can be otherwise configured.

In variants, the method can be used with the system or components thereof described in U.S. application Ser. No. 17/127,125 filed 18 Dec. 2020, which is incorporated herein in its entirety by this reference.

However, the system can include any additional and/or alternative components.

5. Method

The method can include: determining a digital asset S100, determining a batch for the digital asset based on the delivery destination S150, routing the digital asset to a print partner based on the mail parameters S200, optionally printing a physical version of each digital asset S300, and optionally drop-shipping the physical assets S400, and/or any other suitable elements. One or more instances of the method can be repeated for different digital assets, timeframes (e.g., daily, weekly, etc.), and/or otherwise repeated. All or portions of the method can be performed continuously, recurrently (e.g., daily, hourly, etc.), upon receipt of a request, and/or at any other time and/or frequency.

The method can leverage direct physical delivery of physical assets to a facility (e.g., "drop-shipping"), thereby bypassing intermediary stops. The physical assets are preferably drop-shipped to a regional facility and/or a super-regional facility, but can additionally and/or alternatively be drop-shipped to a local facility, a mailbox, and/or any other suitable location. Drop-shipping is preferably associated with a threshold condition such as a saturation condition, but can alternatively not be associated with a threshold condition. The saturation condition is preferably associated with a minimum order volume (e.g., number of mail pieces and/or physical volume, a quantity of digital assets assigned to a batch exceeding a threshold value, etc.), but can alternatively be associated with a minimum weight (e.g., digital asset weight), a maximum weight, a maximum volume, and/or any other suitable threshold. Examples of a saturation condition can be: 100 digital assets, 1000 digital assets, 3000 digital assets, 5000 digital assets, 100 pounds of mail, 12 linear feet, one layer of letter trays, number of standard pallets, and/or any other suitable range therein. The saturation condition can be the same or different for each facility, each print partner, each mail partner, each geographic region, and/or different for each facility, each print partner, each mail partner, each geographic region. The saturation condition can be: predetermined, dynamically determined, manually determined, automatically determined, and/or otherwise determined. The saturation condition can be determined by a mail partner (e.g., by the carrier, by the carrier facility, etc.), determined by a print partner, by a sender, determined using an optimization across cost of time and transport (e.g., monetary cost, environmental impact, etc.), and/or otherwise determined. For example, the saturation condition is dynamically determined by calculating a minimum volume based on an estimated transportation cost (e.g., freight cost, freight cost less carbon credits, etc.).

The method can be performed daily, before a production cutoff time (e.g., deadline to guarantee a physical asset printing within a predetermined time period, such as same-day printing), before a routing cutoff time (e.g., predetermined time before production cutoff time such that there is enough time to print a batch satisfying the saturation condition), upon receipt of a new order, upon receipt of a threshold number of new orders, and/or at any other suitable time and/or frequency.

5.1 Determining a Digital Asset S100.

S100 preferably functions to receive and process a digital asset for routing. The digital asset can be one digital asset, multiple digital assets, and/or any other suitable number of digital assets. The digital assets can be concurrently received from one or more users (e.g., senders, customers, service providers, etc.), but can alternatively be serially received from one or more users. The digital asset can be received as part of an order including multiple digital assets with different delivery addresses, or received individually. The digital asset can be: specified in HTML, be a print ready PDF (e.g., generated from an HTML specification), be an InDesign document, and/or be in any other suitable format. The digital asset is preferably a digital asset, but can alternatively be a document, a model (e.g., of a 2D object, of a 3D object, etc.), and/or any other suitable digital asset.

The digital asset is preferably associated with mail parameters, but can alternatively not be associated with mail parameters. Mail parameters include: a target delivery date and/or date range, a delivery location (e.g., an address, a 3-digit zip code, a zip code, etc.), a facility, a permutation (e.g., combination of mail variable values), and/or any other suitable mail parameters.

The delivery location (e.g., recipient location) can be associated with one or more local facilities, one or more regional facilities, one or more super-regional facilities, and/or any other suitable facilities. The delivery location can be associated with a facility when the delivery location is located within the respective region (e.g., associated with the facility), but can alternatively be otherwise associated with a facility, and/or not be associated with a facility.

The digital asset can be associated with a permutation. The permutation can be a combination of values for: a form factor, a size, a paper poundage, a coating, and/or any other suitable mail variable. Examples of variables include: a type (e.g., postcard, letter, etc.), a color (e.g., black and white, color, etc.), perforation, priority (e.g., first class, standard, etc.), size (e.g., dimensions such as length, width, number of sheets, etc.), imagery, mail by date, delivery date, delivery location (e.g., delivery address, zip code, etc.), quality (e.g., image resolution), and/or any other suitable parameter.

The digital asset is preferably received as part of an order (e.g., a mail order), but can alternatively be received individually or otherwise received. One or more orders from one or more senders can be received by the system within a given routing period (e.g., time period between cutoffs). Each order preferably includes multiple digital assets contemporaneously received from the same entity, but can alternatively be a single digital asset, multiple digital assets contemporaneously received from different entities, and/or otherwise defined. Digital assets in the order can have the same permutation or different permutations. Digital assets in the order preferably have different recipients, but can alternatively have the same recipient. Digital assets in the order preferably have different delivery locations, but can alternatively have the same delivery location. Digital assets in the order can have the same target delivery date or different target delivery dates. For example, an order from a single entity can include a plurality of digital assets, all to be delivered by the same target delivery date, wherein each digital asset of the plurality can include the same logo (e.g., the entity's logo), different visual assets (e.g., background images, foreground images, etc.), and different recipient information (e.g., different delivery locations). The plurality of digital assets can also include a variety of different form factors (e.g., some digital assets are postcards, while others are mailers).

Determining a digital asset can optionally include splitting an order into individual digital assets, wherein each individual digital asset can be treated (e.g., routed) independently. Alternatively, multiple digital assets from a given order can be treated (e.g., routed) together as a unit. The digital assets from different orders can be reorganized into different batches, wherein the digital assets within each batch can share a common: permutation, delivery region, target delivery timeframe, carrier facility, print partner, and/or other mail and/or asset parameter values (e.g., in S150). Alternatively, the orders can be split and/or recombined randomly, manually, and/or otherwise split. However, the digital asset can be otherwise determined.

5.2. Determining a Batch for the Digital Asset S150 Based on the Mail Parameters.

Figure 5:
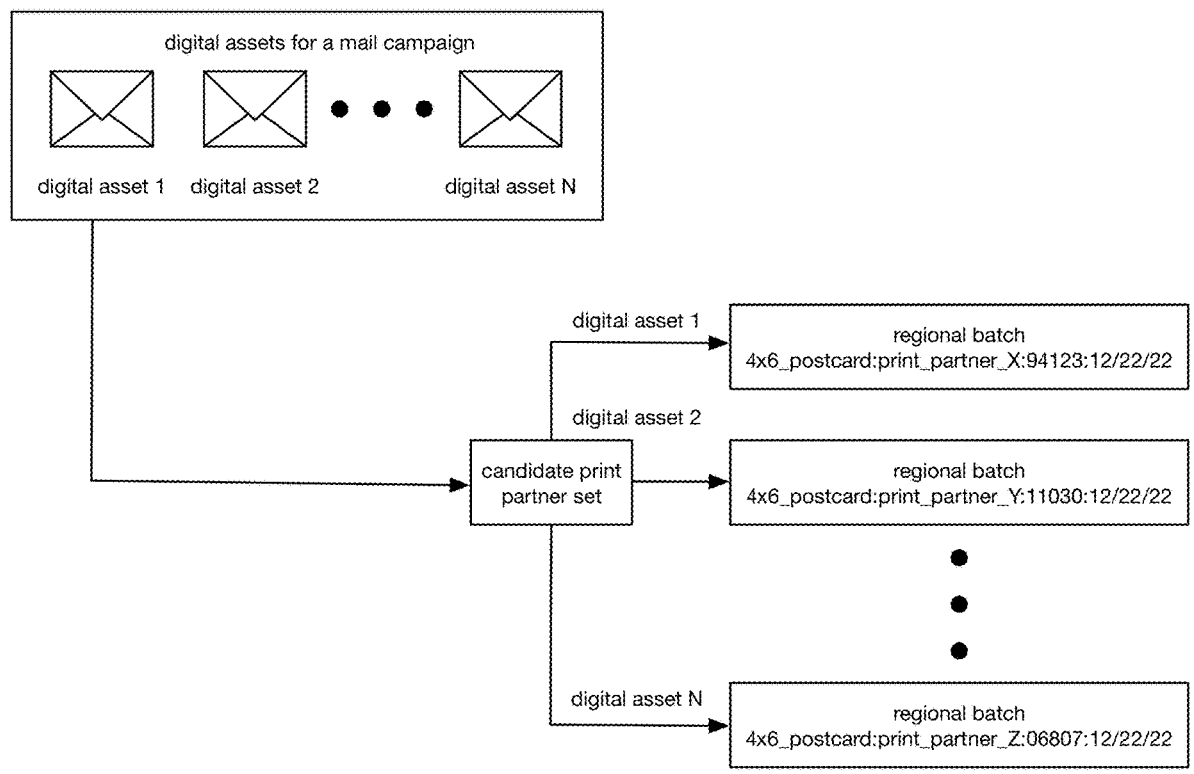
FIG. 5 is an illustrative example of assigning digital assets to regional batches.

The method can optionally include determining a batch for the digital asset based on the mail parameters S150, which functions to determine a set of other digital assets with which to print and mail the digital asset. Each batch (e.g., digital asset set) can include digital assets from the same or different order. The digital assets within each batch can share one or more mail parameter values (e.g., location, permutation, target delivery date, etc.), and/or be unrelated. Each batch can include: a single digital asset, a plurality of digital assets (e.g., from one or more mail campaigns, one or more orders, etc.), and/or any other number of digital assets; example shown in FIG. 5.

Figure 12:
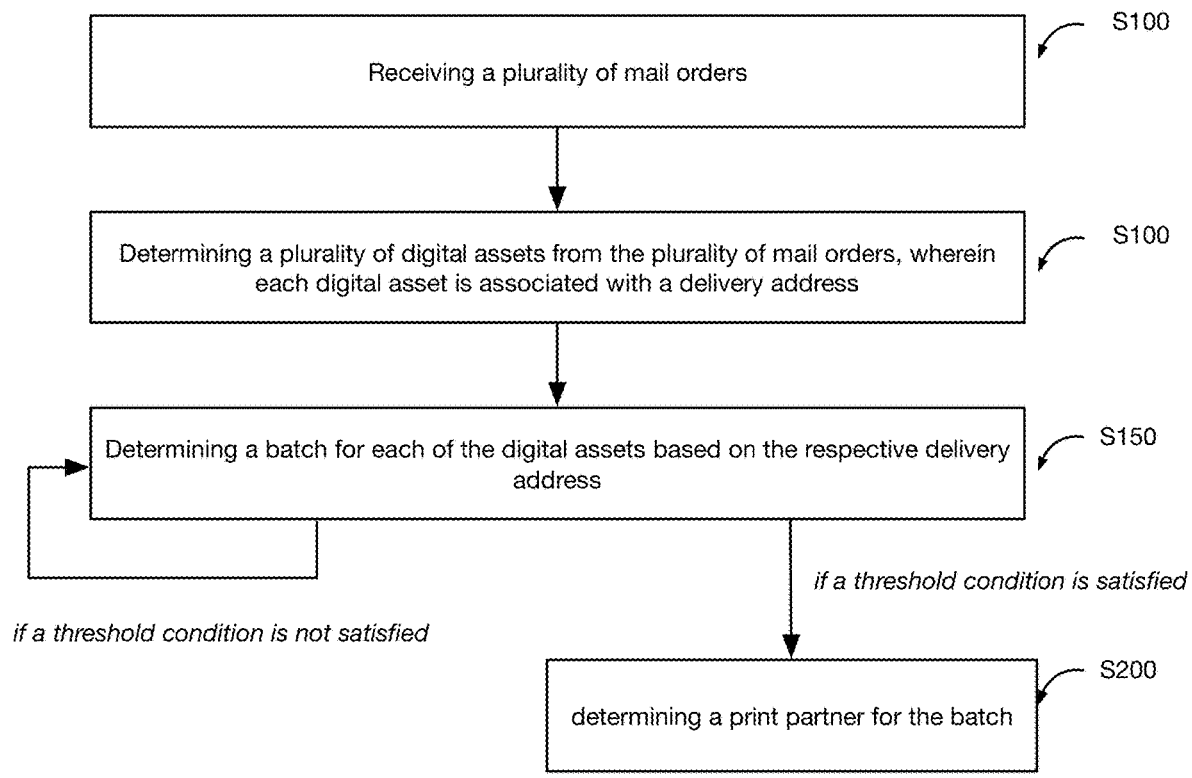
FIG. 12 is a flowchart representation of a variant of the method.

A set of digital assets can subsequently be routed to a printer (e.g., in S200) and delivered in a batch to reduce production costs and enable drop-shipping the entire batch. S150 can be performed continuously (e.g., immediately after S100, upon receipt of each new order, after a start time, etc.), after a requirement is met (e.g., once every digital asset in an order of a specific size is received), recurrently (e.g., daily, hourly, etc.), upon receipt of a request, and/or at any other time and/or frequency. In a first example, the digital assets are immediately assigned to batches upon order receipt, wherein batches for future print dates can be held until said print date. In a second example, the digital assets can be held until the associated print date (e.g., determined based on the respective delivery date and estimated print and delivery time), then assigned to a batch on the print date. However, the digital assets can be batched at any other time. S150 can be performed prior to S200, as a step of S200, and/or otherwise performed. S150 can include determining an initial batch (e.g., a regional batch) for a digital asset, determining a new batch for a digital asset (e.g., example shown in FIG. 12), and/or other processes.

Preferably, a batch is determined for the digital asset such that the digital assets of the batch all share a common delivery region (e.g., common delivery destination region, the same zip code, all delivery destinations within a specified range of a common carrier facility, all delivery destinations within a range of a common print partner, common mail carrier facility coverage zone, etc.) and a common delivery timeframe (e.g., wherein all digital assets in a batch share a target delivery date, wherein all digital assets in a batch have an overlapping target delivery date range, etc.), however the batch can be otherwise determined. In an example, all delivery destinations fall within the coverage zone of a common carrier facility. Optionally, the digital assets of the batch all share a common permutation. The digital assets of the batch can additionally or alternatively share any other mail parameter values, or not share one or more mail parameter values. In variants, a digital asset that is received with fixed asset parameter values can be assigned to a batch sharing that exact permutation. In alternative variants, a digital asset that is received with flexible asset parameter values can be assigned to a batch with a permutation that meets the baseline asset parameter values for the digital asset.

Batches can be formed on the basis of one or more shared: geographic region (e.g., the digital assets in the batch are associated with delivery locations in the same delivery region, or are assigned to be printed in the same print location, etc.), carrier facility (e.g., the digital assets in the batch are assigned to the same carrier facility), print partner (e.g., wherein the digital assets in a batch have all been assigned to the same print partner), delivery timeframe (e.g., wherein the digital assets in a batch are intended to be delivered in the same timeframe), permutation (e.g., the digital assets in a batch have the same permutation values), and/or on another basis. The batches can be formed as the digital assets are being sorted (e.g., the digital assets are sorted into a batch), after the digital assets have been sorted (e.g., the digital assets are assigned to a carrier facility, then batched together), and/or formed at any other time.

In a first variant, determining a batch for the digital asset can include creating a new batch. A new batch can be created if no existing batch exists that shares the same delivery destination region, permutation, and delivery timeframe with the digital asset; if an appropriate batch exists but the quantity of assets already assigned to the batch exceeds a limit (e.g., a standard order volume, based on the capacity of a print partner, etc.); upon receipt of a command; and/or for any other reason.

In a second variant, determining a batch for the digital asset can include assigning the digital asset to an existing batch before the batch is routed to the print partner (e.g., before S200).

In a third variant, the digital asset can be assigned to an existing batch that has already been routed to a print partner (e.g., after S200). In this variant, further digital assets can continue to be assigned to the batch up until a cutoff condition is reached (e.g., a cutoff time, a maximum batch size, etc.).

In a fourth variant, determining a batch for the digital asset can be repeated multiple times with varying constraints. For example, batches of digital assets can be formed at different levels of the carrier facility hierarchy until a print condition is met (e.g., the batch satisfies a minimum drop-ship volume). Batch formation at different carrier facility hierarchical levels can be performed: at a cutoff time, iteratively according to a rule, randomly, concurrently (e.g., wherein the digital asset is assigned to multiple batches for different carrier facilities at the same time), and/or otherwise performed. In a first example of an iterative batching rule, batches are formed starting at the lowest carrier facility level that can accept a drop shipment, then formed at sequentially higher rising carrier facility levels when a print condition is not met (e.g., wherein each subsequent carrier facility services a larger region fully or partially encompassing the prior carrier facility coverage zone). In a second example of an iterative batching rule, batches are formed in reverse carrier facility transfer order, such that batches are preferentially formed at the last carrier facility before physical asset delivery to the delivery location, then formed at the carrier facility that transfers the physical asset to the last carrier facility, proceeding backward through the order in which the physical asset is transferred to the delivery location. In a third example of an iterative batching rule, batches are formed at the regional carrier facility level first, then at the national carrier facility level, then at a secondary regional carrier facility underneath the national carrier facility (e.g., wherein the first and second regional carrier facility share a common national carrier facility), then using alternative batching methodologies (e.g., routing to the print partner closest to the delivery location, geo-routing the digital asset, etc.). At each stage, the method can optionally include attempting to roll lower-level carrier facility batches (e.g., saturated or unsaturated) into higher-level carrier facility batches to saturate the higher-level carrier facility batches, roll up smaller regional batches into national batches and/or adjacent regional batches to saturate said batches, combine batches with different asset permutations that are also assigned to the same carrier facility (e.g., wherein the batches can satisfy a print partner requirement for a printing run, do not individually satisfy a drop-ship minimum volume, but do satisfy the drop-ship minimum volume in combination), and/or otherwise combine or sub-combine the batches. However, batches can be formed (e.g., treating the carrier facility hierarchy as a tree) using: depth-first search (e.g., pre-order, in-order, post-order, reverse pre-order, reverse post-order, reverse in-order, etc.), breadth first search, level-order traversal, reverse level-order traversal, bottom-up traversal, Monte-Carlo tree search, and/or any other suitable rule can be used. In an illustrative example, a digital asset can be assigned to an initial batch based on the respective delivery location, wherein the batch is associated with carrier facility service zone of a common regional facility that encompasses the delivery location. At a cutoff time, if the initial batch is too small, each digital asset of the batch can be re-assigned to a new batch. Optionally, the digital asset can be re-assigned to a new batch, wherein each digital asset of the new batch falls within the carrier facility service zone of a common super-regional facility (e.g., where all of the other assets of the original batch join the new batch). Alternatively, the digital asset can be re-assigned to a new batch, wherein each digital asset of the new batch falls within the carrier facility service zone of a local facility (e.g., where only a subset of the other assets of the original batch joins the new batch). In this example, the batches can also be formed on the basis of the digital assets' permutation (e.g., each batch includes a single permutation; different batches are formed for each carrier facility for each asset permutation). Alternatively, the batches can include a plurality of asset permutations, wherein a print partner capable of printing the set of asset permutations in the batch can be selected to print said batch. In examples, the print partner can be selected and/or the batch can be sent to the print partner when each permutation-specific sub-batch of digital assets satisfies the print partner's requirements to print the permutation (e.g., each permutation-specific sub-batch satisfies a minimum print volume). However, digital asset batch assignment and/or re-assignment can be otherwise iteratively performed.

In a fifth variant, a batch can be determined for a digital asset with flexible asset parameter values. Optionally, a default asset parameter values can be assigned to the digital asset, and any of the prior variants can be used to determine the batch. Additionally or alternatively, a batch is determined with a permutation that satisfies the baseline conditions for the digital asset. In a first specific example, a digital asset can be received with a requirement for a specific pixel resolution, but can be assigned to an existing batch with a higher pixel resolution. In a second specific example, determining a batch for a digital asset with a flexible permutation can include: assigning the digital asset the minimum baseline asset parameter value (e.g., 200 dpi) by default, assigning the digital asset to a lower-quality batch (e.g., a batch with a 200 dpi image quality parameter) in accordance with the minimum baseline asset parameter value, and optionally merging the lower-quality batch with a higher-quality batch (e.g., a batch with a 300 dpi image quality parameter) when a cutoff condition (e.g., a cutoff time, a cutoff order volume) is met if the lower-quality batch and/or the higher-quality batch is unsaturated (e.g., wherein the order volume too low to enable drop-shipping, to meet a print partner's minimum order volume requirement, etc.). In a third specific example, determining a batch for a digital asset with a flexible permutation can include preferentially assigning the digital asset to an existing batch that meets the permutation requirements (e.g., to the existing potential batch that is almost saturated, to the existing potential batch that is furthest from saturation, etc.), and optionally later moving the digital asset to a new batch that meets the permutation requirements (e.g., to ensure that the new batch meets a saturation condition). In a fourth specific example, determining a batch for a digital asset with a flexible permutation can include optimizing for each batch of a set of candidate batches to reach saturation (e.g., minimize the remaining digital assets to saturation).

In a sixth variant, a delivery score can be determined for each digital asset for each of a set of carrier facilities, wherein the digital asset is assigned to a batch, associated with a carrier facility, based on the score. The delivery score can be indicative of: the estimated print time, the estimated delivery time, the estimated cost (e.g., overall cost, print partner cost, delivery cost, etc.), the estimated carbon units needed to deliver the physical asset, probability of the digital asset contributing to saturation condition satisfaction for the carrier facility, and/or indicative of any other suitable metric. The delivery score can be: calculated, predicted (e.g., using a neural network, etc.), and/or otherwise determined. The delivery score can be determined based on: the asset permutations, the characteristics of existing batches (e.g., the volume in each batch, the asset permutations for each batch, the probability of each batch reaching saturation, etc.), the characteristics of the carrier facilities (e.g., saturation volume, etc.), and/or any other suitable input. The digital asset can be assigned to the batch associated with the highestscoring carrier facility, lowest-scoring carrier facility, and/or any other suitable carrier facility.

In a seventh variant, S150 can include determining a batching date (e.g., two days prior to the target delivery date for the digital asset, a predicted print and ship duration prior to the target delivery date, etc.) and/or batching time for each of the digital assets that are received, and assigning each digital asset to the respective batch on the respective batching date and/or at the respective batching time.

However, the batch can be otherwise determined.

5.3. Routing the Digital Asset to a Print Partner Based on the Mail Parameters S200.

Routing the digital asset to a print partner based on the mail parameters S200 preferably functions to determine a print partner with the highest probability of printing and inserting a physical version of the digital asset into the mail stream with sufficient time to arrive at the delivery location by a predetermined delivery date. The digital asset can be routed individually or routed in batches, where all digital assets in the same batch share a common set of mail parameters (e.g., common local facility, common regional facility, common super-regional facility, common permutation, common target delivery date, etc.), and/or otherwise routed. S200 can be performed after S150, using any of the methods described in S150, instead of S150, and/or otherwise performed.

The digital asset (or set thereof) is preferably routed to a capable print partner, but can be routed to any other print partner. Capable print partners can have: the capability to print the digital asset/set (e.g., the print partner can print the permutation associated with the digital asset/set) and the capacity to print the digital asset/set (e.g., the print partner has the capacity to print the volume of assets in the digital asset set for the production day associated with the digital asset set, etc.), or be otherwise defined. The capable print partner(s) can also be determined based on the delivery location of each digital asset, and/or be geographically associated with the digital asset set at one or more levels. For example, the capable print partner(s) can be associated with the same: local facilities (e.g., local geographic regions), regional facilities (e.g., regional geographic regions), super-regional facilities (e.g., super-regional geographic regions), national facilities (e.g., national geographic regions), and/or any other facilities or geographic regions as the digital asset/set. When multiple capable print partners are available for a given digital asset set, a final print partner can be selected from the capable print partner set.

The final print partner can be selected: manually (e.g., after a human operator calls the print partner by phone to verify that they can accept the order), randomly, based on a weight (e.g., select the highest- or lowest-weighted print partner, wherein the weight can be determined as discussed in U.S. application Ser. No. 17/127,125 filed 18 Dec. 2020, which is incorporated in its entirety by this reference, and/or otherwise determined), based on historical batch assignment (e.g., wherein print partners that have been recently assigned batches are less preferred than others), based on physical proximity to the target carrier facility (e.g., that the digital asset set should be drop-shipped to), based on production speed, based on an optimization, and/or otherwise selected. For example, a print partner can be selected by optimizing facility assignment across multiple batches (e.g., to minimize the time-to-delivery for multiple batches, to minimize error from the target delivery date for multiple batches, etc.); by optimizing over cost and/or time (e.g., drop-ship cost, time to print, time from digital asset receipt to delivery at the carrier facility, etc.); and/or optimizing over any other suitable set of parameters.

However, the print partner can be otherwise selected for a digital asset set.

The capable print partner for a digital asset or a batch thereof can be determined: before batching, after batching, and/or any other suitable time. The digital asset can be automatically routed to the print partner, or alternatively only routed upon receipt of a confirmation (e.g., that the print partner still has remaining capacity).

In a first variant, S200 can include geo-routing. Geo-routing is preferably applied to individual digital assets, but can alternatively be applied to batches of digital assets (e.g., wherein digital assets from one or more orders can be batched together based on similar mail parameters), and/or otherwise applied. Geo-routing can include routing a digital asset to a capable print partner within a region based on the delivery destination (e.g., within the destination's zip code, within a specified distance of a mail carrier facility servicing the destination, etc.). In a first embodiment, geo-routing can include routing each digital asset to a capable print partner that is closest to the delivery location.

In a second embodiment, geo-routing includes: routing the digital asset to the lowest-level facility servicing the digital asset's delivery location. For example, geo-routing can include: routing the digital asset to a local capable print partner associated with a local facility (e.g., a DDU) servicing the digital asset's delivery location; when no local print partner is available, routing the digital asset to a regional capable print partner associated with a regional facility (e.g., an SCF) servicing the digital asset's delivery location; when no regional print partner is available, routing the digital asset to a super-regional capable print partner associated with a super-regional facility (e.g., an NDC) servicing the digital asset's delivery location; and when no super-regional capable print partner is available, routing the digital asset to a national capable print partner associated with a national facility servicing the digital asset's delivery location or routing to a print partner using a method as discussed in U.S. application Ser. No. 17/127,125 filed 18 Dec. 2020, which is incorporated in its entirety by this reference. The print partner can be associated with a facility when the print partner is the geographically closest capable print partner to the facility, when the print partner is located within a predetermined distance of the facility, when the print partner is within the facility's geographic region, and/or be otherwise associated with the facility.

Figure 3:
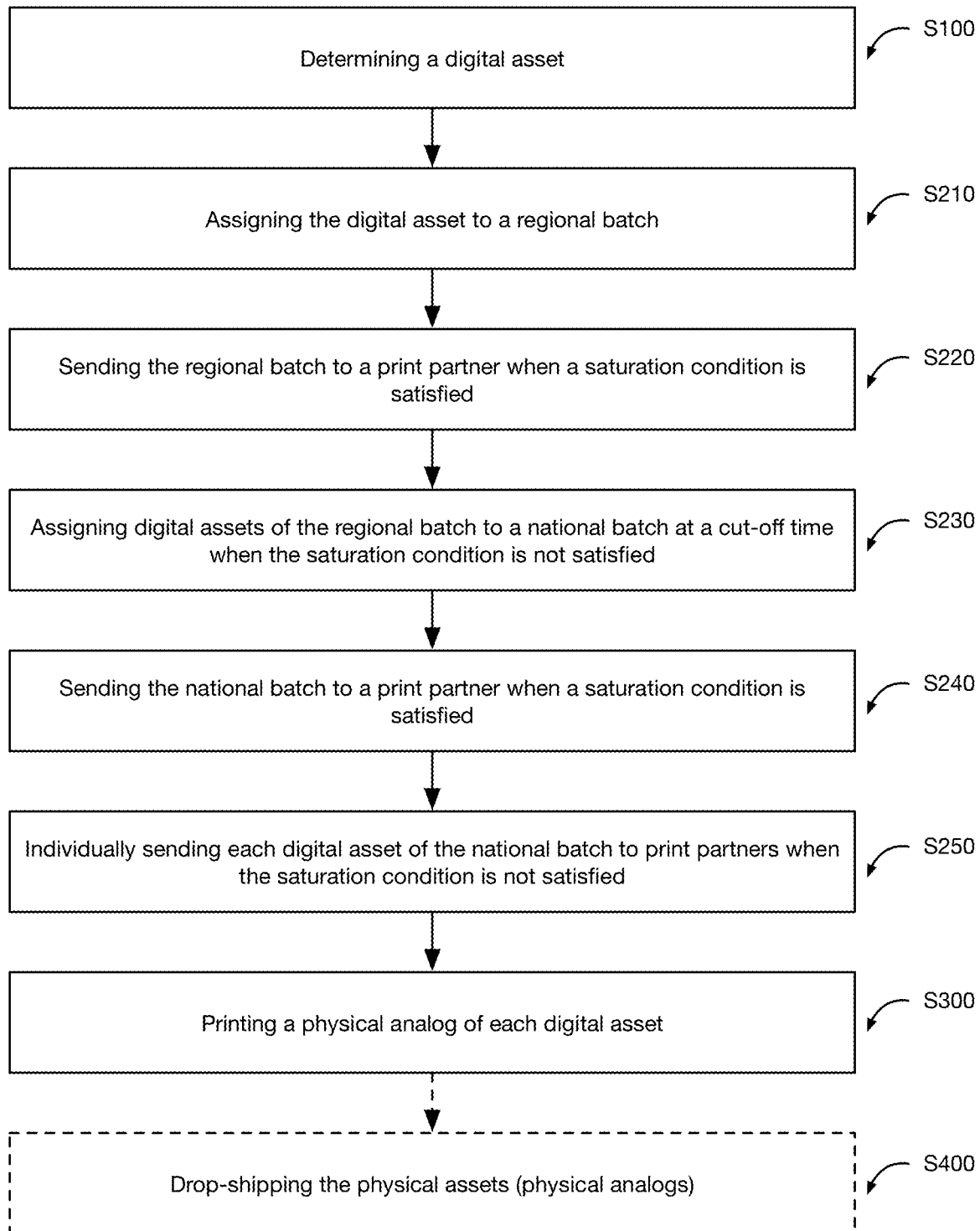
FIG. 3 is a flowchart representation of a variant of the method.

In a second variant, S200 can include zip-based routing; example shown in FIG. 3. Zip-based routing can include: assigning the digital asset to a regional batch S210, sending the regional batch to a print partner when a first threshold condition (e.g., a saturation condition) is satisfied S220, assigning digital assets of the regional batch to a secondary batch at a cut-off time when the first threshold condition is not satisfied S230, sending the secondary batch to a print partner when a second threshold condition is satisfied S240, and optionally individually sending each digital asset of the secondary batch to print partners when the second threshold condition is not satisfied S250. However, zip-based routing can be otherwise performed.

In S210, the digital asset is preferably assigned to a batch sharing all or a portion of the digital asset's permutation, but can be otherwise assigned. The digital assets within the batch preferably have delivery locations serviced by the same facility, but can alternatively have delivery locations serviced by different facilities (e.g., of the same or different hierarchical level). The facility is preferably a regional facility (e.g., such that the batch is a regional batch), but can alternatively be a local facility or a facility at another hierarchical level. The digital assets within the batch can have the same or different: target delivery dates, production days (e.g., receipt date, routing date, print date, print partner assignment date, etc.), and/or any other parameter. The resultant batch can be identified by a batch identifier (e.g., a combination of contextual and asset parameters such as permutation:production_day), or be otherwise identified.

In a first example, each digital asset is assigned to a regional facility, and one or more batches are created for each regional facility. Each digital asset can be assigned to a regional facility based on: the delivery location (e.g., wherein the delivery location is within the regional facility's geographic region), the estimated delivery speed (e.g., whether the asset will be delivered to the delivery location at the target delivery date and/or date range if the asset is drop-shipped to the regional facility), and/or otherwise determined. Batches can then be created based on shared permutations. A capable print partner can be assigned to the batch before or after batch creation (e.g., wherein a capable print partner has capacity for digital asset volume associated with a saturation condition).

In a second example, digital assets are batched by a shared permutation and/or a shared location identifier (e.g., by a 3-digit zip, by a 5-digit zip, etc.) to determine a batch. A capable print partner can then be assigned to the batch before or after batch creation (e.g., wherein a capable print partner has capacity for digital asset volume associated with a saturation condition).

In a third example, S210 includes assigning a digital asset to a regional facility based on a delivery location, determining a capable print partner associated with the regional facility, adding the digital asset to an existing batch for the capable print partner if it exists, and creating a new batch if no existing batch for the capable print partner exists. An existing batch preferably has the same permutation as the digital asset, but can alternatively have a different permutation. The existing batch can be created using this method, created using a method as discussed in U.S. application Ser. No. 17/127,125 filed 18 Dec. 2020, which is incorporated in its entirety by this reference, and/or otherwise created. Creating a new batch with a print partner can include reserving a minimum volume from the capable print partner's capacity, and optionally creating a digital object representative of the batch (e.g., array, variable instance, etc.).

Figure 4:
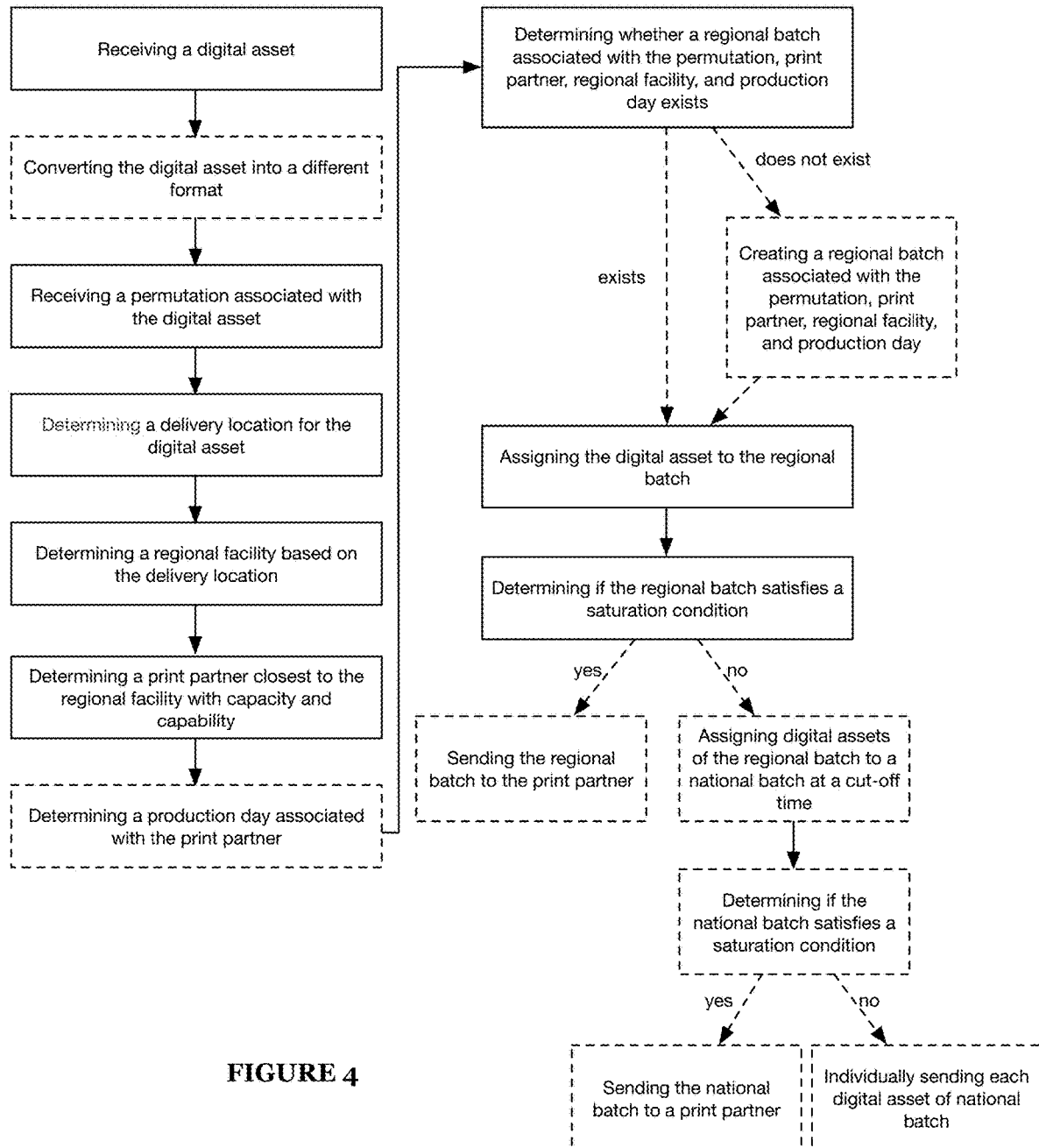
FIG. 4 is an illustrative example of a variant of the method.

In an illustrative example, S210 includes, for a production day: determining a permutation and a delivery location associated with a digital asset; determining a 3-digit zip code based on the delivery location; determining a regional facility associated with the 3-digit zip code; assigning the digital asset to an existing batch having the same permutation for the regional facility; optionally decrementing the available capacity for the print partner assigned to the existing batch; when no existing batch exists, creating a new batch with a print partner closest to the regional facility that has the capability for the permutation and the capacity for a new batch (e.g., the minimum drop-ship volume); optionally decrementing the available capacity for the print partner by the capacity for the new batch (e.g., to reserve capacity in advance since it takes time to aggregate thousands of orders); and assigning the digital asset to the new batch; example shown in FIG. 4.

Sending the regional batch to a print partner when a saturation condition is satisfied S220 functions to start printing the digital assets when the batch can be drop-shipped. The saturation condition (e.g., print condition, threshold condition, etc.) can be: a cutoff time, a minimum digital asset volume, and/or any other suitable threshold condition. The regional batch is preferably sent to a print partner when a saturation condition is satisfied before a routing cut-off time, but can alternatively be sent to a print partner when a saturation condition is satisfied after a routing cut-off time. The print partner is preferably the print partner associated with the regional batch (e.g., located within the regional carrier facility delivery zone, located within a threshold distance of the regional carrier facility, etc.), but can alternatively be a different print partner. The print partner can be assigned to the regional batch at or during batch formation, after batch formation, and/or at any other suitable time. The print partner can have the capacity to print the batch, the capabilities to print the permutations within the batch, and/or be otherwise characterized.

The regional batch can be sent: immediately when a saturation condition is satisfied (e.g., on the production day, the day the batch is created, the day is digital asset is routed, etc.), on a print partner transmission day (e.g., a future production day), and/or any other suitable time. The print partner transmission day can be calculated based on the target delivery date and/or date range (e.g., assuming the print partner will not hold onto the physical assets post printing), or be otherwise determined. For example, the print partner transmission day can be determined by: estimating a delay before printing; estimating the time it takes to print the batch (e.g., for the print partner, on average, etc.); estimating the amount of time it takes for a print partner to drop-ship, estimating the time it takes to deliver the physical asset from the drop-shipped facility to the delivery location; and back-calculating a print partner transmission day by subtracting the time estimates from the target delivery date and/or date range. The estimates can be derived from historical print partner data and/or carrier data (e.g., a print partner transmission time, a carrier insertion time, a carrier delivery time, etc.), but can be otherwise determined.

S220 can optionally include sending other digital assets associated with the permutation to the print partner. Other digital assets can be associated or unassociated with the regional facility (e.g., have a delivery location outside of the regional facility's geographic region). For example, other digital assets can be associated with the print partner using: zip-based routing (e.g., assigned to the routed regional batch), geo-routing, the method discussed in U.S. application Ser. No. 17/127,125 filed 18 Dec. 2020, which is incorporated in its entirety by this reference, and/or any other suitable method.

Assigning digital assets of the regional batch to a secondary batch at a cut-off time when the saturation condition is not satisfied S230 functions to roll up multiple regional batches into a larger batch, which has a higher probability of satisfying the saturation condition prior to a cut-off time. The secondary batch is preferably associated with another carrier facility, more preferably a carrier facility at a higher hierarchical level, but alternatively a carrier facility at the same hierarchical level (e.g., a associated with a physically adjacent coverage region with the carrier facility) and/or a lower hierarchical level (e.g., associated with an overlapping coverage region with the first carrier facility). The secondary batch can be iteratively reformed for one or more carrier facilities (e.g., a predetermined series of carrier facilities). For example, the secondary batch can be a national batch (e.g., associated with a national carrier facility), a secondary regional batch (e.g., associated with a physically adjacent regional carrier facility), and/or any other suitable carrier facility. The cut-off time is preferably earlier than the production day associated with the regional batch, but can alternatively be any other suitable time. In a first example, the cut-off time is the routing cut-off time. In a second example, the cut-off time is the production day.

S230 can include batching together all regional batches that: share the same permutation, are associated with the same super-regional facility, that have not met the saturation condition, have met the saturation condition but satisfy a rollup condition (e.g., have batch sizes smaller than a second threshold volume), and/or any other suitable set of regional batches. The batched regional batches can be batched into a national batch, into another regional batch (e.g., a regional batch for a region adjacent or within a threshold geographic distance from the region of the original regional batch), and/or into any other suitable batch. However, the super batch (e.g., national batch) can be otherwise created. In examples, the national batch can be identified by a national batch identifier (e.g., permutation:print_partner: national-_facility:production_day) or otherwise identified.

S230 can additionally include assigning a capable print partner to the secondary batch (e.g., "secondary print partner", "national print partner"). The capable print partner can be assigned before or after national batch creation. The secondary print partner can be: a regional print partner associated with one of the constituent regional batches; a capable print partner assigned de novo (e.g., based on physical proximity to the national facility, based on location within the national facility's geographic region, etc.); and/or otherwise determined.

S230 can additionally include resetting and/or updating the capacity of the print partner associated with the regional batch if a hold was placed on the regional print partner capacity. For example, the capacity of the print partner associated with the regional batch can be increased by the decremented amount in S210.

In an illustrative example, S230 includes: resetting the capacity of the print partner associated with the regional batch; determining a national facility affiliated with the regional facility defined by the regional batch; determining if a secondary batch associated with the permutation, print partner, national facility, and production day exists; creating a secondary batch if it doesn't already exist; once a secondary batch is created, decrementing the capacity of the print partner associated with the secondary batch by a predetermined unit (e.g., the national facility's drop-ship minimum, a minimum volume, a maximum volume, etc.); and assigning the digital assets of the regional batch to the secondary batch.

Sending the secondary batch to a print partner when a saturation condition is satisfied S240, enables the national print partner to print a batch of physical assets that can be drop-shipped. S240 can be performed at: a cut-off time, when the secondary batch is formed, after a cut-off time, before a production cut-off time, before a production day, and/or any other suitable time. The saturation condition is preferably the same saturation condition as S220, but can alternatively be a different saturation condition. The saturation condition is preferably associated with a minimum volume (e.g., determined by a mail partner, determined by a print partner), but can alternatively be associated with a minimum weight (e.g., digital asset weight), a maximum weight, a maximum volume, and/or any other suitable threshold. The print partner is preferably a print partner associated with the secondary batch, but can alternatively be a print partner closest to the national facility with capability and capacity, and/or any other suitable print partner.

Figure 6:
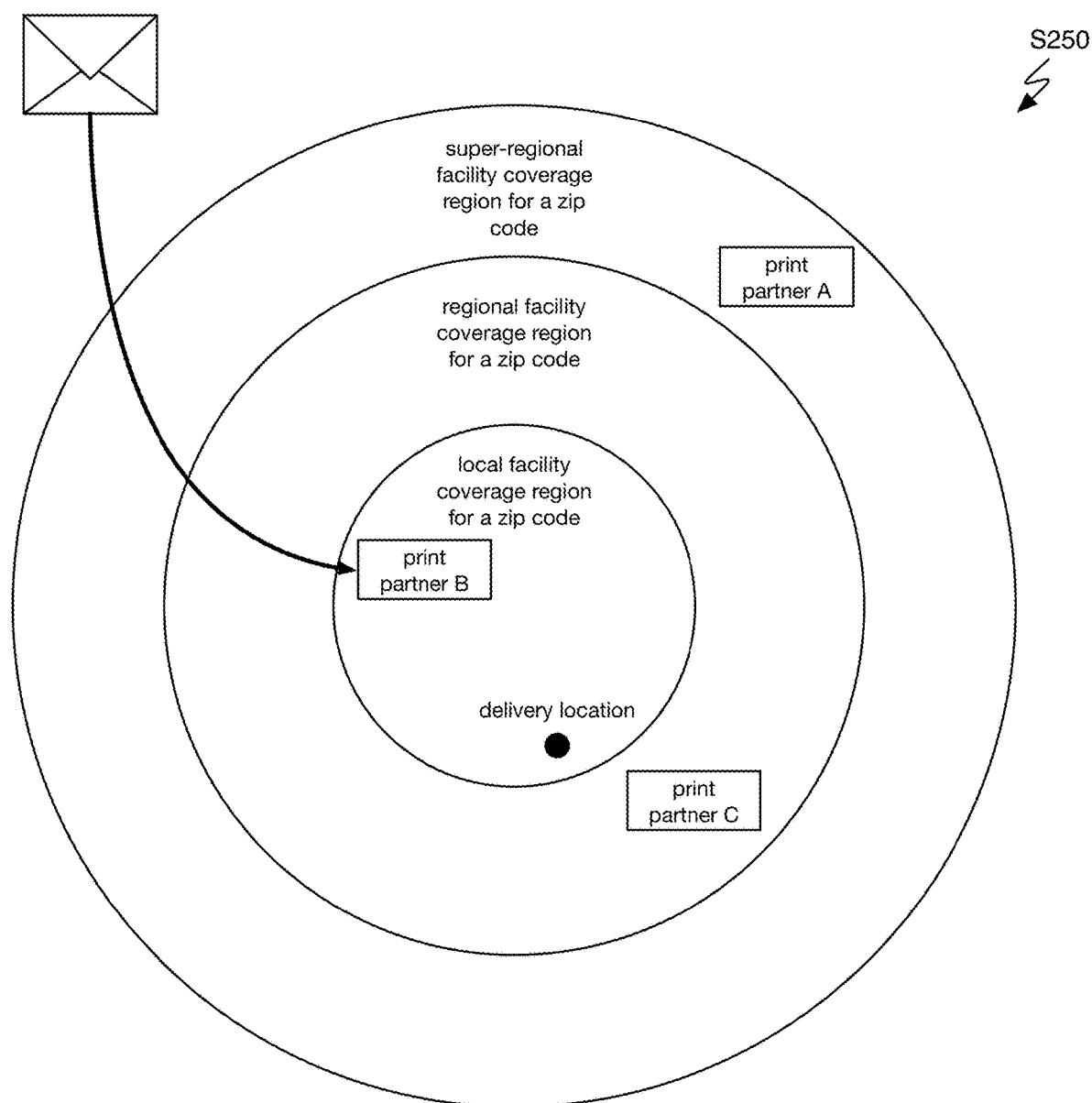
FIGS. 6-8 are illustrative examples of geo-routing.
Figure 7:
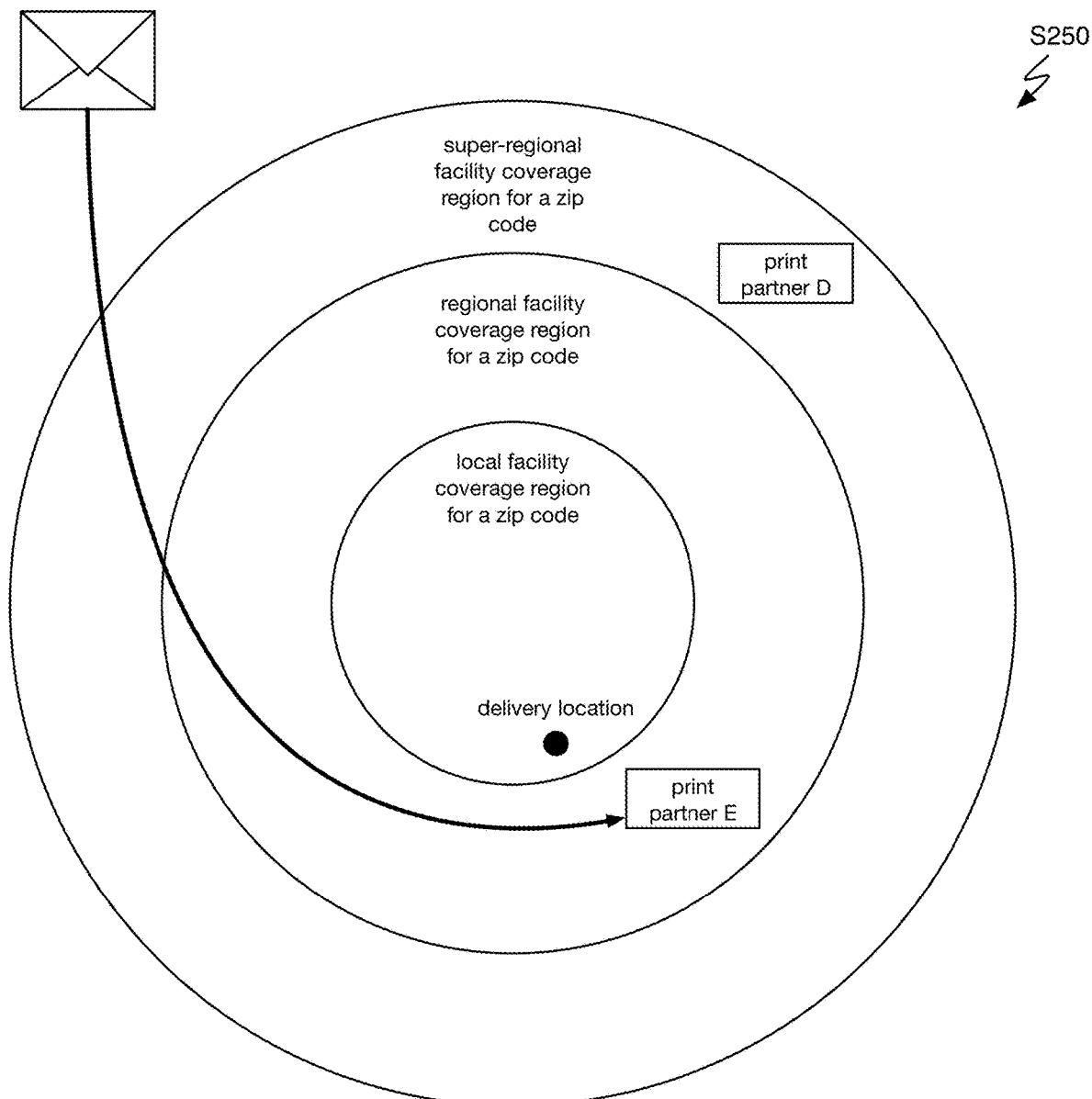
Figure 8:
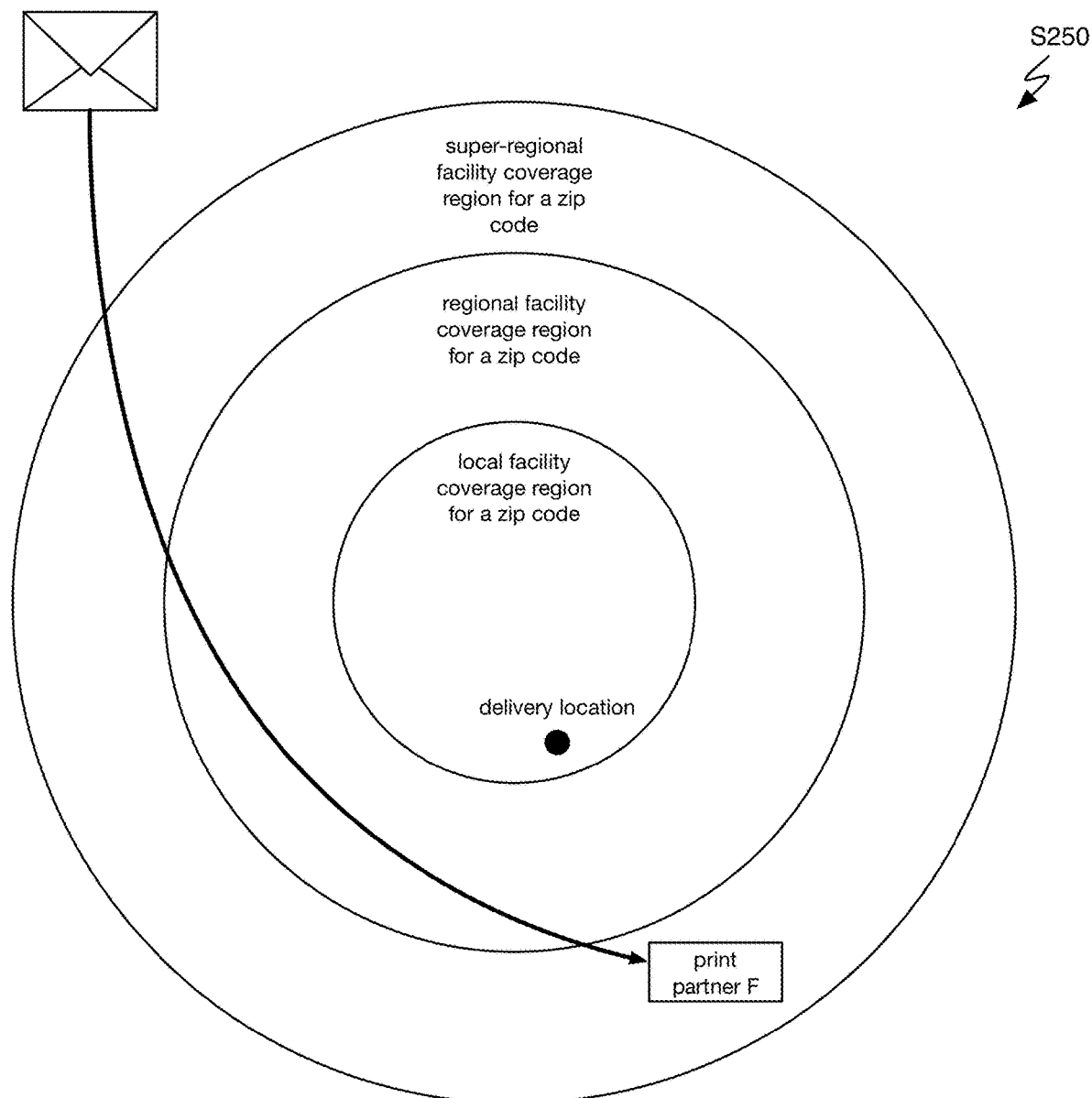

Individually sending each digital asset of the secondary batch when the saturation condition is not satisfied S250 functions to un-batch the national and/or regional batches into constituent digital assets, and individually route each digital asset. S250 can optionally include resetting and/or updating the capacity of the print partner associated with the secondary batch if a hold was placed on the secondary print partner capacity and/or any other suitable element. S250 is preferably performed using the method described in the first variant of S200 (e.g., geo-routing), but can alternatively be performed using the method as discussed in U.S. application Ser. No. 17/127,125 filed 18 Dec. 2020, which is incorporated in its entirety by this reference, and/or any other suitable method. For example, S250 includes: for each digital asset within the secondary batch, determining a set of print partners that have the capability and capacity to print the digital asset, and determining a print partner from the subset based on the delivery location of the digital asset. In a first specific example, the print partner is determined from the subset by selecting the print partner from the subset within the delivery location's local geographic area; example shown in FIG. 6. In a second specific example, the print partner is determined from the subset by selecting the print partner from the subset within the delivery location's regional geographic area if a print partner from the subset within the delivery location's local geographic area does not exist; example shown in FIG. 7. In a third specific example, the print partner is determined from the subset by selecting the print partner from the subset within the delivery location's super-regional geographic area if a print partner from the subset within neither the delivery location's local geographic area nor the delivery location's regional geographic area do not exist; example shown in FIG. 8.

Figure 10:
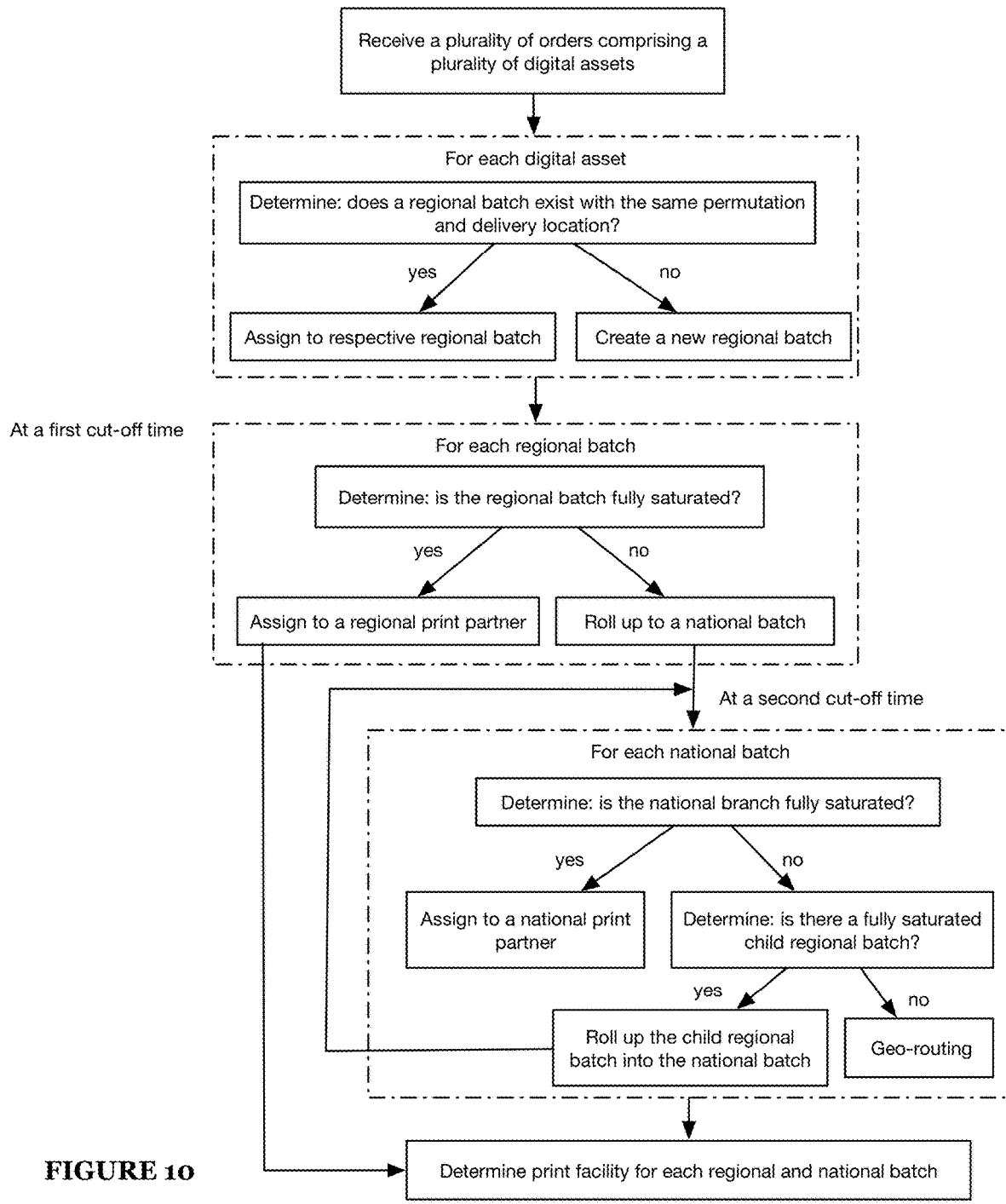
FIG. 10 is a flowchart representation of a variant of the method including a decision tree-based algorithm.

In another illustrative example, S200 can be executed by implementing a decision tree-based algorithm (e.g., example shown in FIG. 10). As orders are received, digital assets from the orders are assigned to regional batches (individually or in sets) based on the asset's permutation and delivery location. Optionally, a new regional batch can be created (e.g., automatically, manually, etc.) each time a digital asset with a unique combination of permutation and delivery location is received. Optionally, a regional batch can be assigned to a regional print partner once a regional batch reaches saturation (e.g., when the number of digital assets assigned to the regional batch exceed a threshold), or before the regional batch reaches saturation (e.g., wherein a minimum batch volume can be reserved from the print partner's capacity). Additionally or alternatively, at a cutoff time (e.g., on the morning of the production date, the afternoon before the production date, etc.) a decision-making process is implemented to determine a print partner for each regional batch. For each regional batch, a regional print partner is associated with the regional batch if the regional batch has reached saturation; otherwise, the regional batch is rolled up to a national batch with an overlapping carrier zone (e.g., wherein the national carrier facility's delivery zone encompasses the regional carrier facility's delivery zone). Subsequently, each national batch is checked for saturation, and assigned a national print partner if saturated. If a national batch is not saturated, the algorithm determines whether there is at least one corresponding regional batch (e.g., defined by a regional carrier facility that has a coverage region encompassed by or overlapping with the coverage region of the national carrier facility) that is fully saturated. If so, one of the corresponding regional batches is selected to be rolled up into the national batch (e.g., wherein the regional batch with the smallest batch size is selected). Once all regional batches have been assigned to a print partner or rolled up to a national branch, each regional batch will be fully saturated, but not all national batches will necessarily be fully saturated. All saturated batches can be assigned to a print partner. The digital assets of any unsaturated batches can optionally be geo-routed to their respective delivery locations, and/or assigned to a print partner in another manner.

Figure 9:
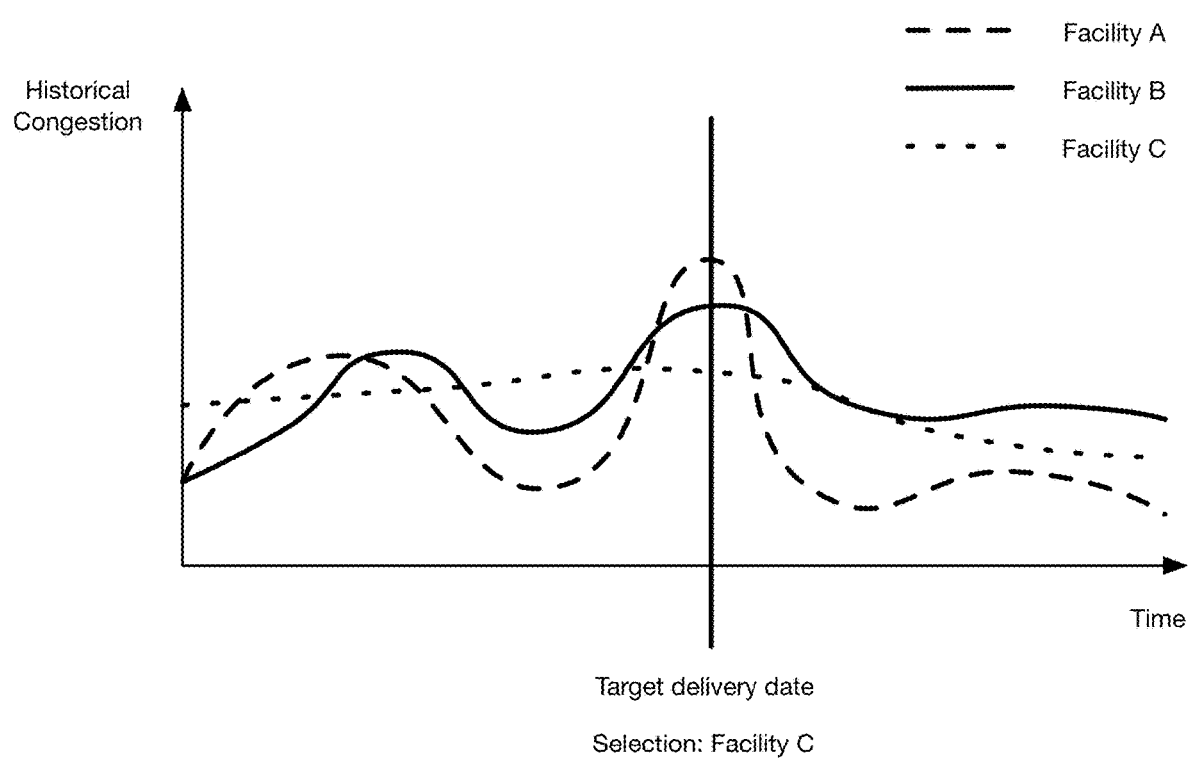
FIG. 9 is an illustrative example of speed-based routing.

In a third variant, S200 can include speed-based routing. In this variant, the asset is routed to the fastest facility (e.g., routed to a print partner associated with the fastest facility, example shown in FIG. 9), and/or the fastest print partner.

The facility is preferably a super-regional facility, but can additionally and/or alternatively be a regional facility, a local facility, and/or any other suitable facility. The facility that the asset is routed to can be: the fastest facility (e.g., super-regional facility), the least congested facility (e.g., super-regional facility), and/or otherwise determined. The fastest facility and/or the fastest print partner can be determined using a congestion and/or speed prediction model, using a set of heuristics, an optimization, a rule, and/or otherwise determined. The model preferably leverages regression (e.g., a random forest regression), but can additionally and/or alternatively be an equation, a neural network (e.g., trained to predict facility congestion), leverage classification, rules, heuristics, decision trees, probability, and/or any other suitable model or methodology. The model is preferably trained on historical congestion data (e.g., tracking data) for the specific facility, but can alternatively be trained on historical congestion data (e.g., tracking data) for similar facilities (e.g., facilities located in the same geographic region, facilities of the same class, etc.; from the same or different carrier) and/or any other data. The model (and underlying training data) can be specific to: a recurrent timeframe (e.g., weeks, months, seasons, weather, fiscal quarters, etc.); a geographic region; a timeframe measured from the current time (e.g., a 2-week period from last month); any other spatial and/or temporal combination; generic (e.g., spatially and/or temporally); and/or otherwise specific or nonspecific. In an illustrative example, the model can identify patterns of congestion within super-regional facilities, such that physical assets can be routed to the fastest or least congested super-regional facility (e.g., for more reliable and predictable service).

Routing the asset to the fastest facility can include: routing the asset to a print partner associated with the fastest facility (e.g., the print partner that is already associated with a batch for the fastest facility; a print partner within a predetermined physical distance or travel time of the fastest facility; etc.); creating a batch for a print partner associated with the fastest facility; routing the asset to any other suitable print partner; and/or otherwise routing the asset to the fastest facility. The model outputs can be used to route assets in this method, in the method discussed in U.S. application Ser. No. 17/540,521 filed on 2 Dec. 2021 which is incorporated herein in its entirety by this reference, and/or otherwise used.

In a fourth variant, S200 can include cost-based routing. In this variant, the asset is routed to the facility that will reduce the costs associated with printing and/or shipping, while meeting a shipping timeframe. The lowest-cost facility can be determined with respect to the asset, a batch containing the asset, or a set of batches.

Cost-based routing can incorporate elements of any of the other variants to determine a set of potential facilities that are predicted to ensure the digital asset will arrive within a shipping timeframe associated with the digital asset. The lowest-cost facility can be determined from the set of potential facilities.

The lowest-cost facility and/or the lowest-cost print partner can be determined using a cost prediction model, using a set of heuristics, using a set of historical data, using a set of published prices, and/or otherwise determined. The model preferably leverages regression (e.g., a random forest regression), but can additionally and/or alternatively be an equation, a neural network (e.g., trained to predict costs associated with printing and shipping), leverage classification, rules, heuristics, decision trees, probability, optimization, and/or any other suitable model or methodology. The model is preferably trained on historical cost data (e.g., cost tracking data) for the specific facility, but can alternatively be trained on historical cost data for similar facilities (e.g., facilities located in the same geographic region, facilities of the same class, etc.; from the same or different carrier), published data (e.g., determined from a website), and/or any other data. The model (and underlying training data) can be specific to: a recurrent timeframe (e.g., weeks, months, seasons, weather, fiscal quarters, etc.); a geographic region; a timeframe measured from the current time (e.g., a 2-week period from last month); any other spatial and/or temporal combination; generic (e.g., spatially and/or temporally); and/or otherwise specific or nonspecific. The data that is leveraged can relate to the costs associated with an individual print partner (e.g., prices charged), the costs of shipping (e.g., fuel, truck driver pay per hour, etc.), the costs associated with a facility (e.g., UPS vs FedEx shipping costs), and/or any other costs incurred in the printing and shipping process. In an illustrative example, the model can identify patterns of cost fluctuation across facilities and print partners (e.g., across seasons), such that physical assets can be routed to a print partner such that the total costs associated with printing with the print partner and shipping with the closest facility to the printer are minimized.

However, the digital asset can be otherwise routed.

5.4. Printing a Physical Version of Each Digital Asset S300.

Printing a physical version (e.g., a physical analog) of each digital asset S300 functions to create the physical asset for each digital asset. S300 is preferably performed by the print partner that the digital asset was routed to (e.g., individually or as part of a batch), but can alternatively be performed by a mail partner, and/or any other suitable entity. Printing the physical asset (e.g., the physical version of the digital asset) can include: setting up the print machine based on the digital asset's permutation, optionally aggregating a digital proof of the digital asset (e.g., from a programmatic representation of the digital asset, from a tabular representation of the digital asset, etc.), and printing the physical asset based on the digital asset using the machine. One or more physical assets for a digital asset can be printed. Physical assets for one or more digital assets can be printed: concurrently, contemporaneously, serially, and/or with any other suitable temporal relationship. The physical asset is preferably printed at a print time, but can alternatively be printed at a random time, and/or any other suitable time.

In a first variant, the print time is specified by the platform (e.g., back calculated based on an estimate time to print for the print partner, time for the print partner to drop-ship to a facility, and time to deliver to delivery location from the drop-ship facility, etc.).

In a second variant, the print time is determined by the print partner.

In a third variant, the print time is the production day.

However, the print time can be any other suitable time.

However, the physical version of each digital asset can be otherwise printed.

5.5. Drop-Shipping the Physical Assets S400.

Drop-shipping the physical assets S400 functions to send the physical assets to a facility to be drop-shipped. The physical assets are preferably drop-shipped as a batch, but can alternatively be drop-shipped individually, and/or in any other suitable manner. The batch can be the same batch routed in S200, but can alternatively be a different batch. The batch can include: only digital assets within the routed batch, but can alternatively include other digital assets. The physical assets are preferably drop-shipped by a print partner (e.g., associated with the batch), but can alternatively be drop-shipped by a carrier, a third-party transportation system, and/or any other suitable entity. The physical assets are preferably drop-shipped to the carrier facility associated with the batch, but can alternatively be drop-shipped to another carrier facility (e.g., an adjacent carrier facility, a higher-level carrier facility encompassing the original carrier facility, etc.), and/or drop-shipped to another facility. The carrier facility to drop-ship to (and/or other drop-ship parameters, such as drop-ship time, location, etc.) can be provided to the print partner for association with the batch of physical assets (e.g., with the digital asset information; using an API; etc.), provided to the courier transporting the batch of physical assets to the carrier facility, and/or otherwise provided. The physical assets are preferably drop-shipped at a drop-ship time, but can alternatively be drop-shipped at a random time, and/or any other suitable time.

In a first variant, the drop-ship time is specified by the platform (e.g., calculated based on an estimated time to delivery).

In a second variant, the drop-ship time is determined by a print partner.

However, the drop-ship time can be any other suitable time.

However, the physical assets can be otherwise drop-shipped.

All references cited herein are incorporated by reference in their entirety, except to the extent that the incorporated material is inconsistent with the express disclosure herein, in which case the language in this disclosure controls.

Different processes and/or elements discussed above can be performed and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, configured to:
   receive an order comprising a set of digital assets, each associated with a different delivery address;
   determine a set of batches, each associated with a carrier facility, wherein each carrier facility services a delivery region wherein the carrier facilities are arranged in a hierarchy;
   batch each of the digital assets into one of a set of batches based on the respective delivery address falling within the delivery region associated with the respective batch, wherein each of the digital assets is further batched into one of the set of batches based on the hierarchy;
   select a print partner for each batch, wherein the print partner is located proximal the respective delivery region; and
   send the digital assets within a batch to the print partner when a threshold condition for the batch is met, wherein the print partner prints physical analogs of the digital assets.

2. The system of claim 1, wherein the print partner drop-ships the physical analogs to the carrier facility associated with the batch.

3. The system of claim 1, wherein each batch is specific to an asset permutation.

4. A system, configured to:
   receive an order comprising a set of digital assets, each associated with a different delivery address;
   determine a set of batches, each associated with a carrier facility, wherein each carrier facility services a delivery region;
   batch each of the digital assets into one of a set of batches based on the respective delivery address falling within the delivery region associated with the respective batch;
   select a print partner for each batch, wherein the print partner is located proximal the respective delivery region;
   send the digital assets within a batch to the print partner when a threshold condition for the batch is met, wherein the print partner prints physical analogs of the digital assets; and when the threshold condition is not met, re-batch digital assets from the batch into other batches.

\* \* \* \* \*